(12) United States Patent
Muraishi

(10) Patent No.: US 12,468,491 B2
(45) Date of Patent: Nov. 11, 2025

(54) INSPECTION APPARATUS, AND CONTROL METHOD OF INSPECTION APPARATUS

(71) Applicant: CANON KABUSHIKI KAISHA, Tokyo (JP)

(72) Inventor: Masaaki Muraishi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/172,919

(22) Filed: Feb. 22, 2023

(65) Prior Publication Data
US 2023/0273755 A1    Aug. 31, 2023

(30) Foreign Application Priority Data
Feb. 28, 2022  (JP) ................................ 2022-028901

(51) Int. Cl.
*G06F 3/12*    (2006.01)
*H04N 1/00*    (2006.01)

(52) U.S. Cl.
CPC .......... *G06F 3/1208* (2013.01); *G06F 3/1215* (2013.01); *G06F 3/1258* (2013.01); *H04N 1/00363* (2013.01); *H04N 1/0044* (2013.01)

(58) Field of Classification Search
CPC .... G06F 3/1208; G06F 3/1215; G06F 3/1258; H04N 1/00363; H04N 1/0044
See application file for complete search history.

(56) References Cited

U.S. PATENT DOCUMENTS

| 6,106,093 A * | 8/2000 | Nagoshi | H04N 1/3871 |
| | | | 347/41 |
| 2005/0151770 A1* | 7/2005 | Takeuchi | B41J 11/42 |
| | | | 347/9 |
| 2006/0033461 A1* | 2/2006 | Kakegawa | H02P 29/02 |
| | | | 318/434 |
| 2008/0112014 A1* | 5/2008 | Sato | H04N 1/387 |
| | | | 358/401 |
| 2009/0091780 A1* | 4/2009 | Takemoto | B41F 33/16 |
| | | | 358/1.15 |
| 2009/0202134 A1* | 8/2009 | Kano | G06V 30/1444 |
| | | | 382/141 |
| 2014/0093139 A1* | 4/2014 | Yamagishi | H04N 1/00005 |
| | | | 382/112 |
| 2019/0258709 A1* | 8/2019 | Campbell | G06F 40/177 |
| 2019/0348170 A1* | 11/2019 | Ishikawa | G16H 10/60 |
| 2021/0142459 A1* | 5/2021 | Ito | G06T 7/001 |

FOREIGN PATENT DOCUMENTS

JP    2012003335 A    1/2012

* cited by examiner

*Primary Examiner* — Akwasi M Sarpong
*Assistant Examiner* — Michael L Burleson
(74) *Attorney, Agent, or Firm* — Canon U.S.A., Inc. IP Division

(57) ABSTRACT

An inspection apparatus includes a display control unit configured to display information on a display unit, a setting unit configured to set one or more areas including an object to be inspected, and an inspection unit configured to inspect data read from the object included in the one or more areas set by the setting unit. The display control unit displays a graphic to enable recognition of an upper limit of data to be inspected by the inspection apparatus. When the setting unit sets one or more areas, the display control unit displays values based on an amount of data on the object included in the one or more areas set by the setting unit as a graph.

20 Claims, 26 Drawing Sheets

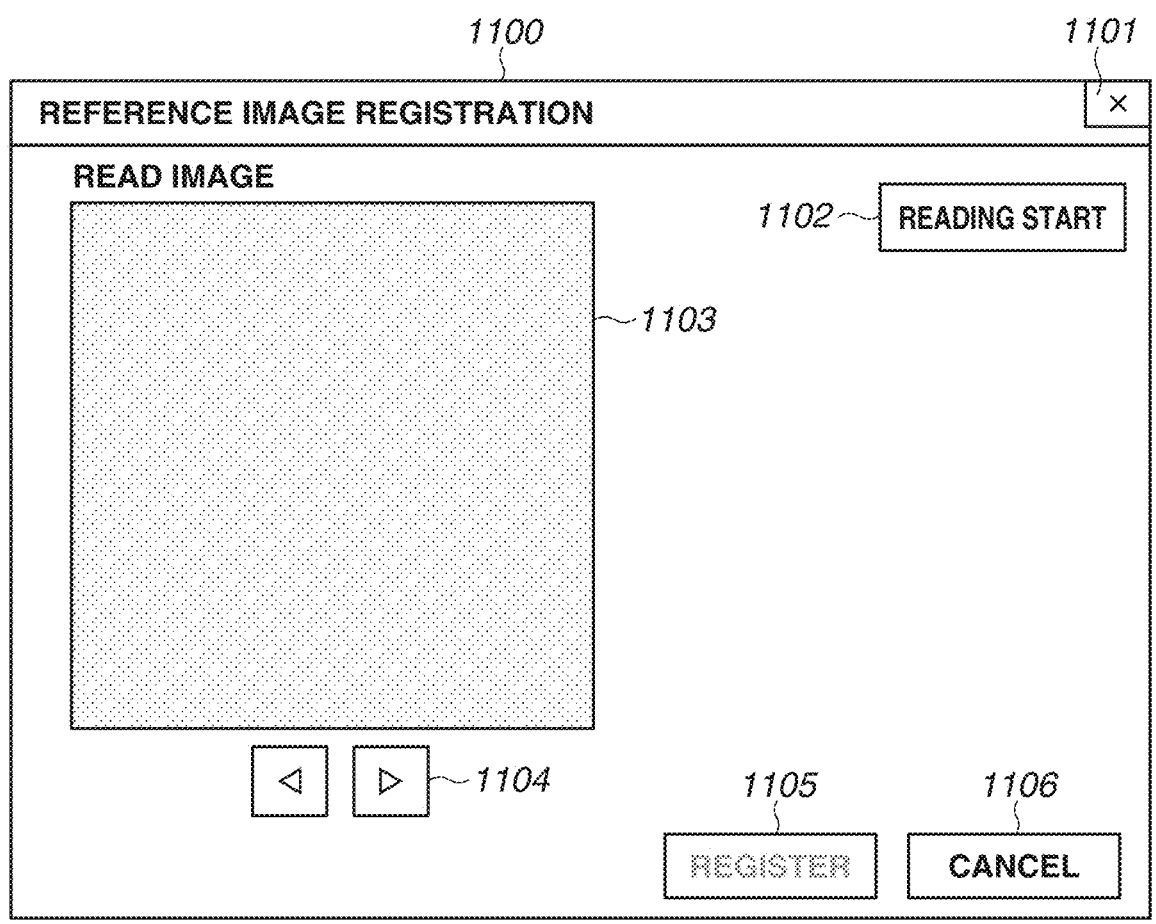

FIG.17

| SHEET SIZE | NUMBER OF SETTABLE AREAS PER PAGE |
|---|---|
| A3 | 30 |
| B4 | 30 |
| A4R | 30 |
| A4 | 30 |
| B5R | 30 |
| B5 | 25 |
| A5R | 30 |
| 11 × 17 | 30 |
| LGL | 30 |
| LTR | 30 |
| LTRR | 30 |
| STMTR | 30 |
| SRA3 | 30 |
| 12 × 18 | 30 |
| EXEC | 28 |
| EXEC-R | 30 |
| 13 × 19 | 30 |

FIG.18A

| FONT SIZE | NUMBER OF CHARACTERS | NUMBER OF USED AREAS |
|---|---|---|
| ~ 12 pt | ~ 30 CHARACTERS | 1 |
|  | ~ 100 CHARACTERS | 2 |
| ~ 20 pt | ~ 30 CHARACTERS | 1 |
|  | ~ 100 CHARACTERS | 2 |

FIG.18B

| BARCODE TYPE | CHARACTER TYPE | NUMBER OF CHARACTERS | NUMBER OF USED AREAS |
|---|---|---|---|
| CODE 1 | NUMBER | ~ 280 | 1 |
|  |  | ~ 420 | 2 |
|  |  | ~ 1580 | 5 |
|  |  | ~ 2520 | 10 |
|  | ALPHANUMERIC CHARACTER | ~ 170 | 1 |
|  |  | ~ 250 | 2 |
|  |  | ~ 950 | 5 |
|  |  | ~ 1530 | 10 |
|  | CHINESE CHARACTER | ~ 70 | 1 |
|  |  | ~ 100 | 2 |
|  |  | ~ 400 | 5 |
|  |  | ~ 640 | 10 |
| CODE 2 | NUMBER | ~ 120 | 1 |
|  |  | ~ 280 | 2 |
|  |  | ~ 560 | 5 |
|  |  | ~ 1390 | 10 |
|  | ALPHANUMERIC CHARACTER | ~ 90 | 1 |
|  |  | ~ 210 | 2 |
|  |  | ~ 410 | 5 |
|  |  | ~ 1040 | 10 |

THERE IS PAGE ON WHICH AREAS MORE THAN NUMBER OF SETTABLE AREAS ARE SET.

CURRENT INSPECTION SETTINGS TAKE A LOT OF TIME TO EXECUTE INSPECTION, AND INSPECTION CANNOT BE ACCURATELY PERFORMED IN SOME CASES.

PRESS "OK" TO EXECUTE INSPECTION AT LOWER PRINTING SPEED, OR PRESS "CANCEL" TO RETURN TO INSPECTION SETTING SCREEN.

OK    CANCEL

INSPECTION APPARATUS, AND CONTROL METHOD OF INSPECTION APPARATUS

BACKGROUND

Field of the Disclosure

The present disclosure relates to an inspection apparatus, and a control method of an inspection apparatus.

Description of the Related Art

Heretofore, an inspection (verification) to check whether a printed material is accurately printed has been manually performed. An apparatus for automatically performing an inspection as post-processing of a printer has recently been used. Such an inspection apparatus (verification apparatus) performs an inspection called a printed image inspection (pattern inspection) to detect a defect on a pattern portion of a printed material. Along with the printed image inspection, a data inspection is also performed on a variable area portion, such as a character string or a barcode, in variable printing in which the content to be printed out on a sheet can be varied based on data. In the pattern inspection and the data inspection, a user first sets an area to be inspected. Then, the pattern inspection and the data inspection are performed on the set area while a printed sheet is conveyed. If it is determined that the printed sheet is defective, the defective sheet can be discharged to a discharge destination that is different from the discharge destination for a normal sheet.

In a printing system that automatically performs an inspection as post-processing of a printer, it may be desirable to complete the inspection on each printed sheet during a period in which the printed sheet is conveyed and passes through the inspection apparatus so as to control switching between the discharge destination for the normal sheet and the discharge destination for the defective sheet. In other words, there is a time limit for the inspection on each printed sheet. If a large number of areas to be inspected are set in the printing system that automatically performs the inspection, inspection processing to be performed on the set areas takes a long time, which makes it difficult to complete the inspection on each printed sheet within a time limit. Japanese Patent Application Laid-Open No. 2012-003335 discusses a method in which a priority of each object to be inspected is calculated based on print object information (object type, color, and size) about the object to be inspected and inspection processing is performed only on the objects that can be inspected within a predetermined time limit based on the priority.

SUMMARY

According to embodiments of the present disclosure, an inspection apparatus includes a display configured to display information, and one or more controllers having one or more processors and one or more memories. The one or more controllers are configured to set one or more areas including an object to be inspected, inspect data to be read from the object included in the one or more set areas, and cause the display to display a graphic to enable recognition of an upper limit of data to be inspected by the inspection apparatus, and to display values based on an amount of data on the object included in one or more set areas as a graph.

Further features of the present disclosure will become apparent from the following description of exemplary embodiments with reference to the attached drawings.

BRIEF DESCRIPTION OF THE DRAWINGS

FIGS. 11A and 11B each illustrate an example of a UI screen for reference image registration according to the first exemplary embodiment.

FIGS. 12-2A and 12-2B each illustrate an example of a UI screen for inspection setting according to the first exemplary embodiment.

FIG. 17 illustrates an example of the number of settable areas according to the first exemplary embodiment.

FIGS. 18A and 18B each illustrate an example of a conversion table according to the first exemplary embodiment.

DESCRIPTION OF THE EMBODIMENTS

Exemplary embodiments according to the present disclosure will be described in detail with reference to the accompanying drawings. The following exemplary embodiments are not intended to limit the scope of the disclosure, and not all of the combinations of the features described in the exemplary embodiments are indispensable for the solution to the issues of the present disclosure.

In the following description, an image forming apparatus is also referred to as a multi-function peripheral (MFP).

Techniques on which the exemplary embodiments are based will be described below. In an inspection apparatus according to an exemplary embodiment of the present disclosure, correct answer image (reference image) data is first registered. Next, the image forming apparatus outputs input image data onto a sheet. Next, an inspection sensor included in the inspection apparatus reads a printed material that is printed out on the sheet. The image data read by the inspection sensor is compared with the correct answer image data first registered, thereby detecting a defect on the printed material. An inspection to detect a defect on a pattern portion of the printed material is referred to as a printed image inspection (pattern inspection).

Along with the printed image inspection, an inspection is also performed on a variable area portion, such as a character string or a barcode, in variable printing. Examples of such an inspection include a data readability inspection to check whether a character string or a barcode can be read, and a data comparison inspection to compare a result of reading a character string or a barcode with correct answer data. The data readability inspection and the data comparison inspection are collectively referred to as a data inspection. The term "variable printing" refers to printing in which the content to be printed out on a sheet can be varied based on data. The correct answer data is prepared in advance by, for example, designating a comma separated value (CSV) file or the like.

When the pattern inspection and the data inspection are performed while a printed sheet is conveyed and it is determined that the printed sheet is defective, the defective sheet can be discharged to a discharge destination that is different from the discharge destination for a normal sheet. This configuration prevents the defective sheet from being mixed with normal sheets and enables an operator to discard the defective sheet.

Figure 1:
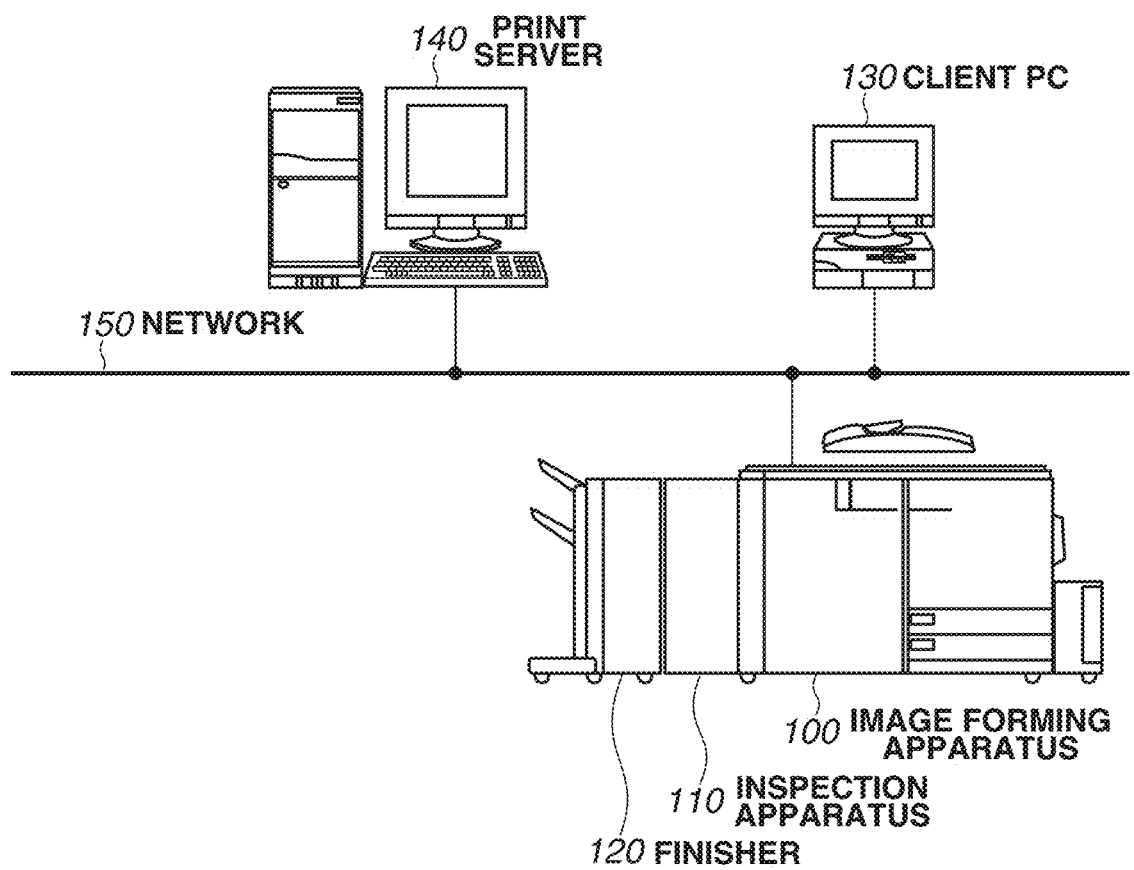
FIG. 1 illustrates an example of a system configuration including an inspection apparatus according to a first exemplary embodiment of the present disclosure.

FIG. 1 illustrates a system configuration including the inspection apparatus according to a first exemplary embodiment. A system according to the present exemplary embodiment includes an image forming apparatus 100, an inspection apparatus 110, a finisher 120, a client personal computer (PC) 130, a print server 140, and a network 150.

The image forming apparatus 100 is configured to print out sheets based on various input data such as print data transmitted from the client PC 130 and the print server 140.

The inspection apparatus 110 receives a printed material output from the image forming apparatus 100, and performs an inspection to check whether there is a defect on the received printed material. The term "defect" used herein refers to a defect that causes a deterioration in the quality of a printed material. Examples of the defect include stain that occurs due to a color material applied to an unintended area during printing processing, and color omission that occurs when a sufficient amount of color material cannot be applied to an intended area.

Further, the inspection apparatus 110 performs an inspection on a variable area portion, such as a character string or a barcode, in variable printing. Examples of such an inspection include a data readability inspection to check whether a character string or a barcode can be read, and a data comparison inspection to compare a result of reading a character string or a barcode with correct answer data. In other words, the inspection apparatus 110 performs the printed image inspection and the data inspection as described above.

The finisher 120 receives the output sheet inspected by the inspection apparatus 110, switches the discharge destination based on the inspection result from the inspection apparatus 110, performs post-processing (e.g., binding) as needed, and discharges the sheet.

The image forming apparatus 100 is connected to the client PC 130 and the printer server 140 via the network 150, and is also connected to the inspection apparatus 110 and the finisher 120 via a communication cable. The inspection apparatus 110 is connected not only to the image forming apparatus 100, but also to the finisher 120 via the communication cable. The image forming apparatus 100 according to the present exemplary embodiment is an in-line inspection apparatus in which image formation processing, inspection processing, post-processing, and sheet discharge processing are performed in an integrated manner. In the present exemplary embodiment, at least the image forming apparatus 100 and the inspection apparatus 110 are collectively referred to as a printing system.

[Block Diagram of Image Forming Apparatus]

Figure 2:
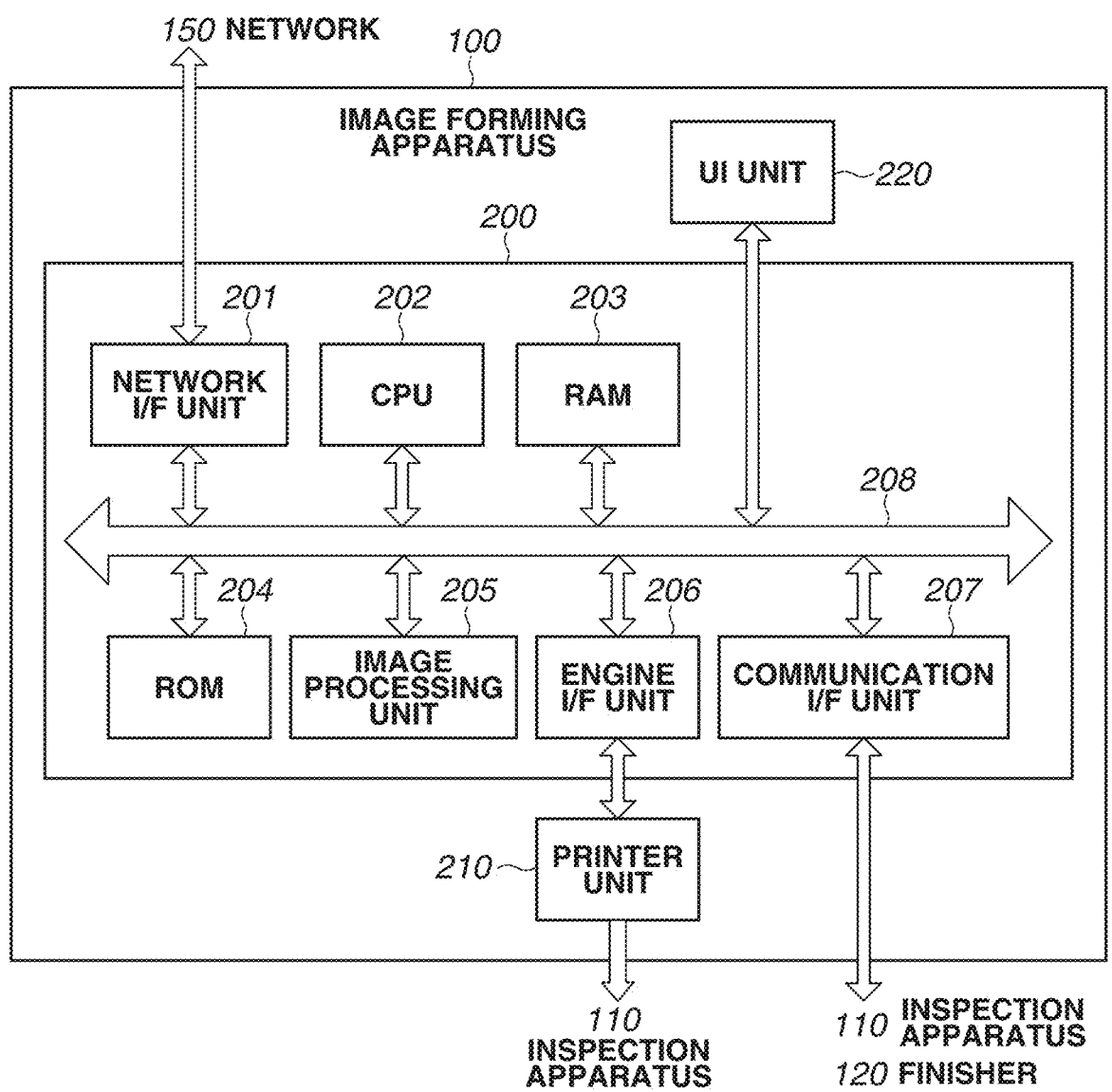
FIG. 2 is a block diagram illustrating an internal configuration of an image forming apparatus according to the first exemplary embodiment.

FIG. 2 illustrates an internal configuration of the image forming apparatus 100 according to the present exemplary embodiment.

A controller 200 receives an image or a document from the network 150, and converts the received image or document into print data. A printer unit 210 prints print data on a recording sheet (paper, sheet). A user interface (UI) unit 220 receives an instruction for the image forming apparatus 100 from the operator. The image forming apparatus 100 includes the controller 200, the printer unit 210, and the UI unit 220 described above.

A network interface (I/F) unit 201, a central processing unit (CPU) 202, a random access memory (RAM) 203, a read-only memory (ROM) 204, an image processing unit 205, an engine I/F unit 206, a communication I/F unit 207, and a system bus 208 to be described below are components of the controller 200. The network I/F unit 201 transmits and receives data to and from the network 150. The CPU 202 controls the overall operation of the image forming apparatus 100. The RAM 203 is used as a work area for the CPU 202 to execute various instructions. The ROM 204 stores, for example, data on programs to be executed by the CPU 202 at start-up, and setting data for the controller 200.

The image processing unit 205 performs raster image processor (RIP) processing for converting image or document data received from the network 150 into print data.

The engine I/F unit 206 transmits the print data to the printer unit 210.

The communication I/F unit 207 communicates with the inspection apparatus 110 and the finisher 120. The system bus 208 is an internal bus.

An image or a document created on the client PC 130 or the print server 140 on the network 150 is transmitted as page description language (PDL) data to the image forming apparatus 100 via a network (e.g., a local area network). The transmitted PDL data is stored in the RAM 203 via the network I/F unit 201. A print instruction issued by the operator of the UI unit 220 is also stored in the RAM 203 via the system bus 208. Examples of the print instruction issued by the operator include an instruction to select a sheet type.

The image processing unit 205 acquires PDL data stored in the RAM 203, and performs image processing for converting the PDL data into print data. The image processing for converting PDL data into print data is, for example, rasterizing PDL data, converting the data into multi-valued bitmap data, and performing screen processing or the like to thereby convert the data into binary bitmap data. The binary bitmap data obtained by the image processing unit 205 is transmitted to the printer unit 210 via the engine I/F unit 206.

The printer unit 210 prints the received binary bitmap data on a recording sheet with a coloring material. The CPU 202 issues an instruction to the printer unit 210 based on the operator's print instruction stored in the RAM 203. For example, when the operator issues an instruction to print data on coated paper, the CPU 202 issues an instruction to the printer unit 210 to output a sheet from a sheet cassette (not illustrated) in which coated paper is stored in the image forming apparatus 100. The CPU 202 controls various processing, including the processing of receiving PDL data and printing the PDL data on a sheet, thereby forming a full-color toner image on the sheet.

[Internal Configuration of Inspection Apparats]

Figure 3:
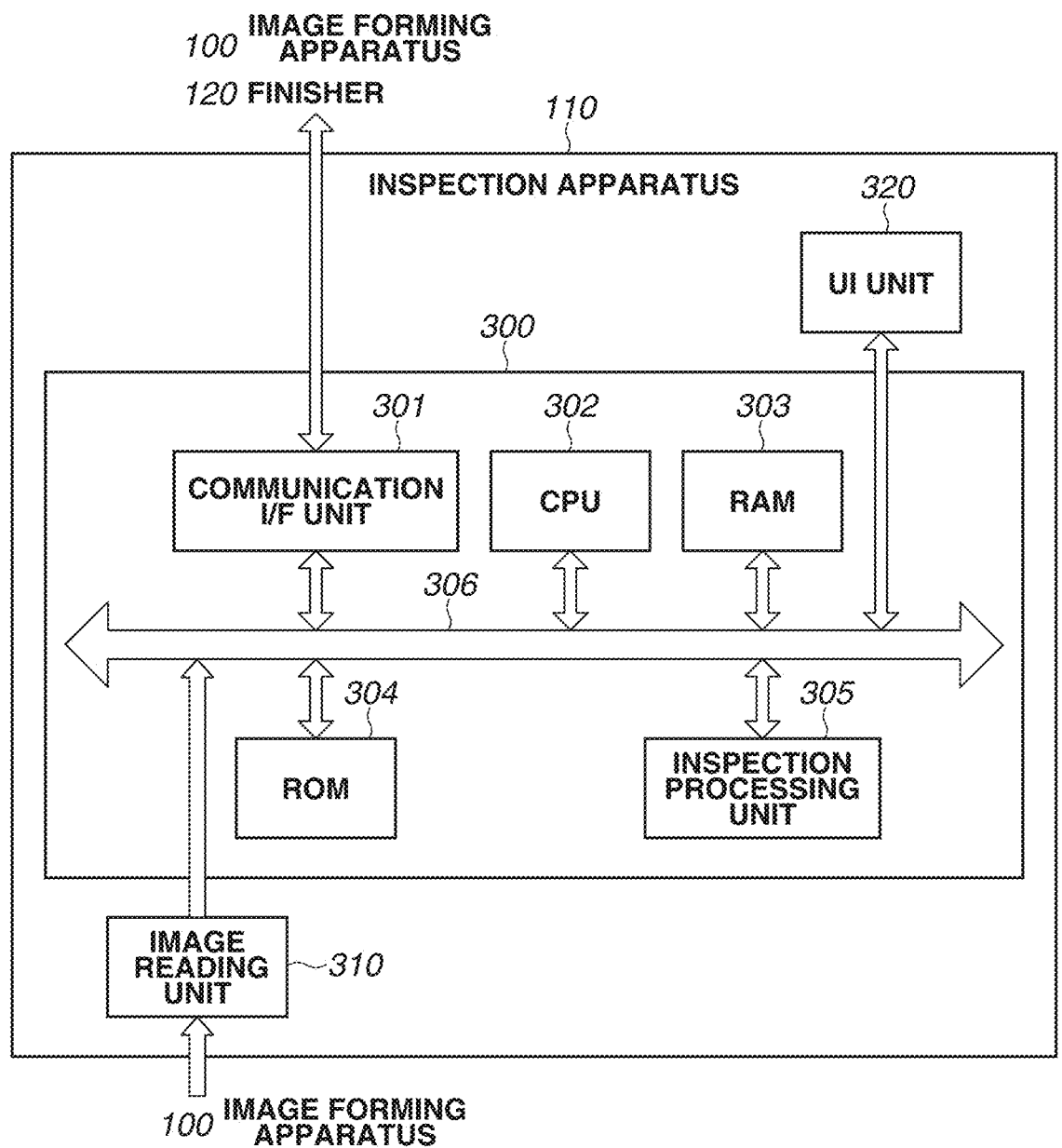
FIG. 3 is a block diagram illustrating an internal configuration of the inspection apparatus according to the first exemplary embodiment.

FIG. 3 illustrates an internal configuration of the inspection apparatus 110. An inspection control unit 300 controls the overall operation of the inspection apparatus 110, performs an inspection to check whether there is a defect on a printed material, and performs an inspection on a variable area portion, such as a character string or a barcode. The term "variable area" used herein refers to an area where an image to be printed is different from page to page.

An image reading unit 310 reads the printed material conveyed from the image forming apparatus 100. The image reading unit 310 executes scanning on the conveyed printed material to generate a scanned image. A UI unit 320 receives an instruction about a setting made by the operator on the inspection apparatus 110, and displays the inspection result. The setting made by the operator on the inspection apparatus 110 relates to a setting item indicating the type of a defect to be inspected in the inspection on a printed material. The inspection item is used to determine whether there is a defect, such as a circular defect (spot) or a linear defect (streak), on a variable area portion, such as a character string or a barcode. The inspection apparatus 110 includes the inspection control unit 300, the image reading unit 310, and the UI unit 320 described above. In the present exemplary embodiment, the UI unit 320 is also referred to as a display unit. A CPU 302 serving as a display control unit controls a screen to be displayed on the UI unit 320.

A communication I/F unit 301, the CPU 302, a RAM 303, a ROM 304, an inspection processing unit 305, and a system bus 306 to be described below are components of the inspection control unit 300. The communication I/F unit 301 communicates data with the image forming apparatus 100 and the finisher 120. The CPU 302 controls the overall operation of the inspection apparatus 110. The RAM 303 is used as a work area for the CPU 302 to execute various instructions. The ROM 304 stores, for example, data on programs to be executed by the CPU 302 at start-up, and setting data for the inspection control unit 300. The inspection processing unit 305 performs an inspection to check whether there is a defect on a printed material. The system bus 306 is an internal bus.

An outline of the printed image inspection to be performed by the inspection apparatus 110 will now be described.

The inspection apparatus 110 causes the image reading unit 310 to read the printed material conveyed from the image forming apparatus 100, and acquires a scanned image to be inspected. The acquired scanned image to be inspected is stored in the RAM 303.

Next, the inspection apparatus 110 causes the inspection processing unit 305 to calculate a difference value between the scanned image to be inspected and the reference image that is preliminarily stored in the RAM 303 as a correct answer image.

The inspection apparatus 110 then performs the inspection by comparing the calculated difference value with an inspection threshold (contrast and size) in each inspection item for each pixel. The inspection result is stored in the RAM 303. Examples of the inspection result include information indicating whether there is a defect on a printed material, the type (spot or streak) of the detected defect, and positional information about the defect to be displayed on the UI unit 320.

An outline of the data inspection to be performed by the inspection apparatus 110 will now be described.

The inspection apparatus 110 causes the image reading unit 310 to read the printed material conveyed from the image forming apparatus 100, and acquires a scanned image to be inspected. The acquired scanned image to be inspected is stored in the RAM 303. Next, the inspection apparatus 110 causes the inspection processing unit 305 to perform an inspection to check whether a character string or a barcode can be read based on preset font information for optical character recognition (OCR) or barcode standards. The inspection apparatus 110 can also perform the data comparison inspection to compare the result of reading a character string or a barcode with correct answer data to check whether the reading result matches the correct answer data. The inspection result is stored in the RAM 303. Examples of the inspection result include a result of reading a character string or a barcode from a printed material, a result of comparison with correct answer data, and positional information about the read character string or barcode to be displayed on the UI unit 320. The correct answer data may be preliminarily stored in the RAM 203 of the inspection apparatus 110, or the correct answer data may be acquired in each processing via the network 150 and may be temporarily stored in the RAM 203.

The inspection apparatus 110 then causes the CPU 302 to instruct the UI unit 320 to display the inspection result stored in the RAM 303. The inspection result is displayed on the UI unit 320, thereby enabling the operator to recognize the inspection result.

If a certain number of defective printed materials are continuously generated, the inspection apparatus 110 causes the CPU 302 to transmit the above-described information to the image forming apparatus 100 via the communication I/F unit 301.

The information indicating that a certain number of defective printed materials are continuously generated is received by the controller 200 via the communication I/F unit 207. When the controller 200 receives the above-described information, the CPU 202 instructs the printer unit 210 to interrupt printing. The image forming apparatus 100 instructs the printer unit 210 to stop printing, thereby terminating the print operation.

Further, the inspection apparatus 110 causes the CPU 302 to transmit the information to the finisher 120 via the communication I/F unit 301 based on the inspection result stored in the RAM 303. The information to be transmitted to the finisher 120 is information indicating whether there is a defect on the printed material. The finisher 120 discharges non-defective printed materials to a normal discharge tray and discharges defective printed materials to another tray, which is different from the normal discharge tray, based on the received information.

<UI Screen>

FIGS. 5 to 14B each illustrate an example of a screen to be displayed on the UI unit 320 of the inspection apparatus 110, and the screen is displayed based on an instruction from the CPU 302 of the inspection apparatus 110.

An inspection process in the printing system according to the present exemplary embodiment is roughly divided into four processes. The first process is a font registration process for registering font information to perform a text inspection. The second process is a reference image registration process for registering a correct answer image to be compared with an inspection image. The third process is an inspection setting process for setting an area to be inspected, an inspection level, and the like. The fourth process is an inspection process for performing an inspection based on the reference image registered for an inspection job and the inspection settings. In the inspection process according to the present exemplary embodiment, the font registration process, the reference image registration process, the inspection setting process, and the inspection process are carried out in this order. The font registration process will be described with reference to FIGS. 6 to 9. The reference image registration process will be described with reference to FIG. 10 and FIGS. 11A and 11B. The inspection setting process will be described with reference to FIGS. 12-1A to 12-2B. The inspection process will be described with reference to FIG. 13 and FIGS. 14A and 14B.

Figure 5:
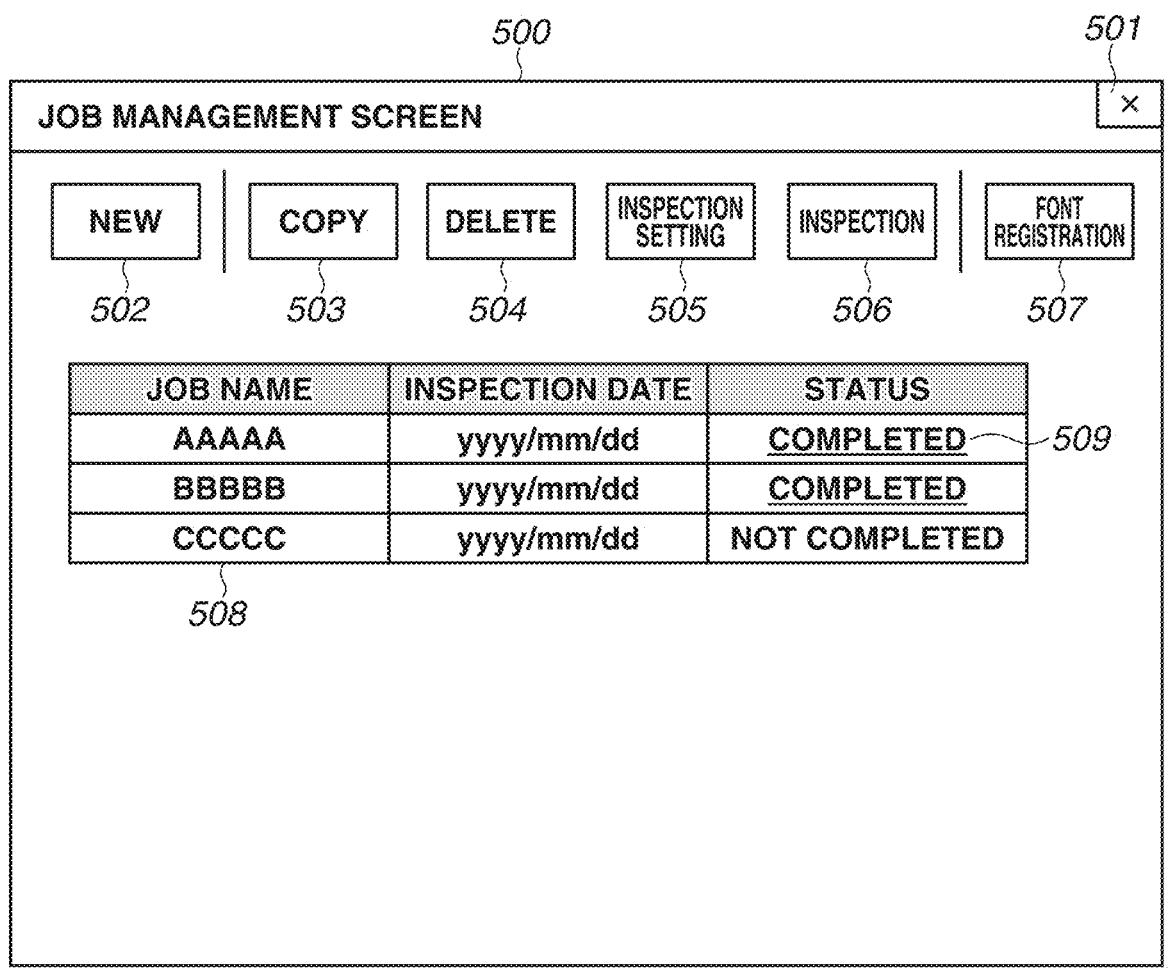
FIG. 5 illustrates an example of a user interface (UI) screen for job management according to the first exemplary embodiment.

FIG. 5 illustrates an example of a job management screen 500 to be displayed on the UI unit 320.

The job management screen 500 is displayed at start-up of the inspection apparatus 110. Alternatively, the job management screen 500 is displayed when an application is started according to an operation performed by the operator on the UI unit 320. The job management screen 500 can transition to each of the font registration process, the reference image registration process, the inspection setting process, and the inspection process. A button 501 is used to hide the job management screen 500.

A button 502 is used to create a new inspection job. When the button 502 is pressed, the screen transitions to a reference image registration job setting screen 1000 illustrated in FIG. 10. A button 503 is used to copy the already created inspection job. The button 503 is pressed to copy the inspection job selected in an inspection job list 508. Copying the inspection job makes it possible to copy the reference image and inspection settings and to perform a new inspection. A button 504 is a delete button to delete the inspection job selected in the inspection job list 508. In this case, a plurality of inspection jobs can be selected and the selected plurality of inspection jobs can also be simultaneously deleted by pressing the button 504.

A button 505 is an inspection setting button to make inspection settings for the inspection job on which the reference image registration process is completed. When the button 505 is pressed, the screen transitions to a font registration image reading screen 800 illustrated in FIG. 8. A button 506 is an inspection button to perform the inspection process corresponding to the inspection job on which the reference image registration process and the inspection setting process are completed. When the button 506 is pressed, the screen transitions to an inspection job setting screen 1400 illustrated in FIG. 14A.

A button 507 is a font registration button to register font information to perform a text inspection. When the button 507 is pressed, the screen transitions to a font list screen 600 illustrated in FIG. 6. The list of created inspection jobs is displayed on the inspection job list 508. An area 509 is an area where the status of the inspection result is displayed. On the area 509, "completed" is displayed for the inspection job on which the inspection process is completed. An inspection report can be output by pressing the area where "completed" is displayed.

The font registration process will now be described with reference to FIGS. 6 to 9.

Figure 6:
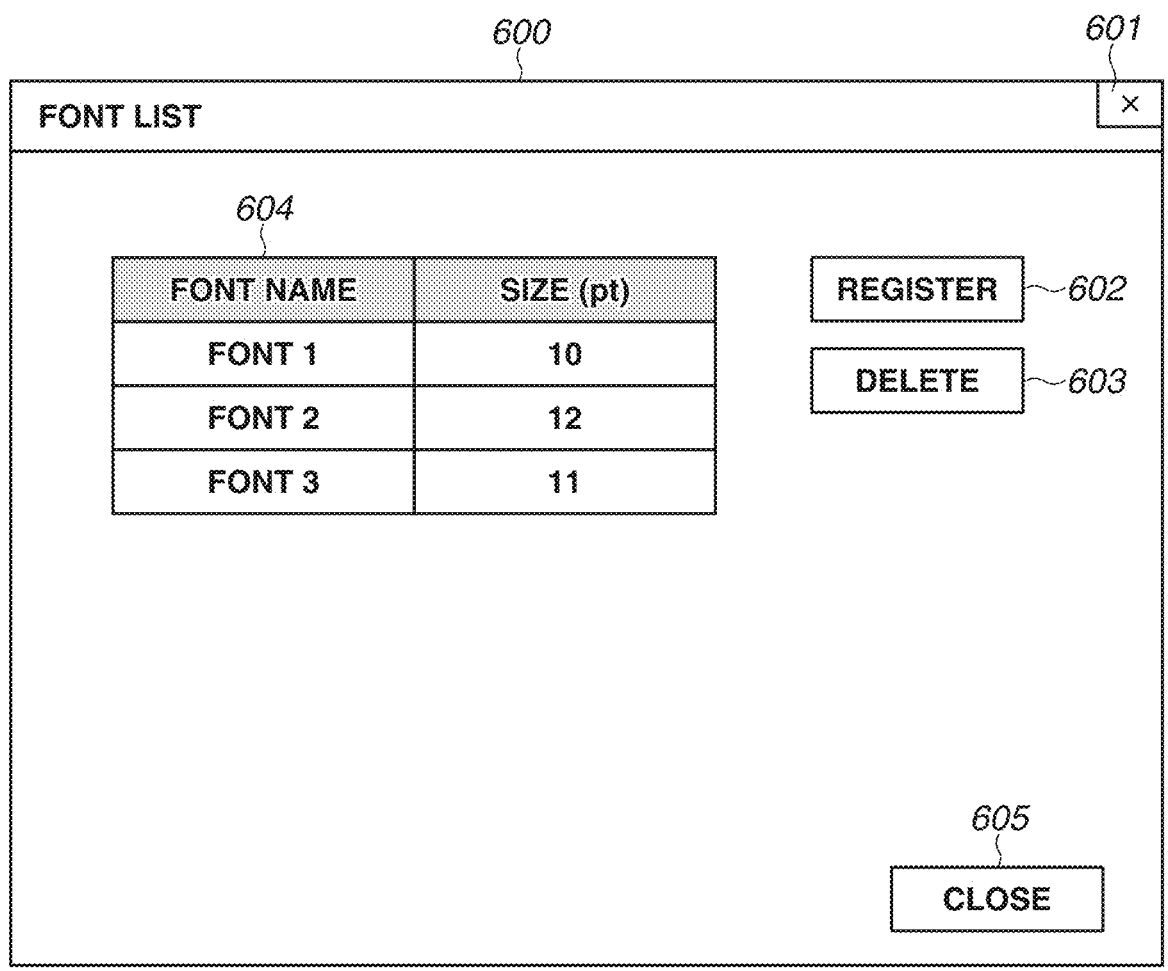
FIG. 6 illustrates an example of a UI screen for displaying a font list according to the first exemplary embodiment.

FIG. 6 illustrates an example of a screen to be displayed on the UI unit 320 of the inspection apparatus 110 to check the registered font. In this case, registration of a new font and deletion of the already registered font are performed. A button 601 is used to hide the font list screen 600. When the button 601 is pressed, the screen transitions to the job management screen 500 illustrated in FIG. 5. The font list screen 600 illustrated in FIG. 6 may be configured to be displayed in a superimposed manner on the job management screen 500 illustrated in FIG. 5.

A button 602 is used to register a new font. When the button 602 is pressed, the screen transitions to a font registration job setting screen 700 illustrated in FIG. 7. A button 603 is used to delete the already registered font. When the operator selects a font to be deleted from a font list 604 and presses the button 603, the selected font is deleted from the font list 604. A list of registered fonts is displayed on the font list 604. A button 605 is used to hide the font list screen 600. When the button 605 is pressed, the screen transitions to the job management screen 500 illustrated in FIG. 5.

Figure 7:
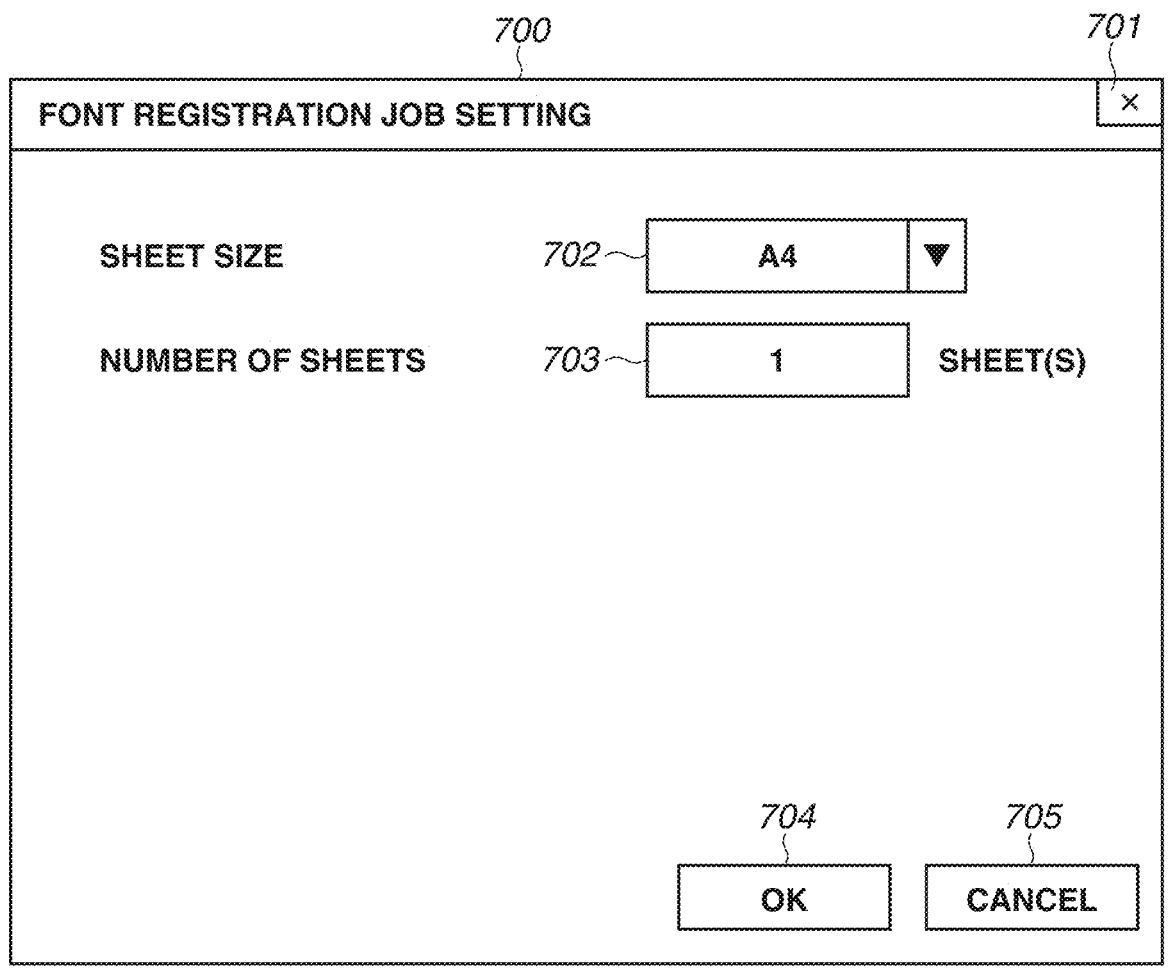
FIG. 7 illustrates an example of a UI screen for font registration job setting according to the first exemplary embodiment.

FIG. 7 illustrates an example of a screen to be displayed on the UI unit 320 of the inspection apparatus 110 to make font registration job settings. In the font registration process, a font to be registered is registered by reading a sheet on which the font is printed. Accordingly, in the case of registering a new font, the size of each sheet to be read and the number of sheets are set.

A button 701 is used to hide the font registration job setting screen 700. When the button 701 is pressed, the screen transitions to the font list screen 600 illustrated in FIG. 6. The font registration job setting screen 700 illustrated in FIG. 7 may be configured to be displayed in a superimposed manner on the font list screen 600 illustrated in FIG. 6.

A setting area 702 is used to set the sheet size for the print job on which the font registration process is performed. A setting area 703 is used to set the number of sheets for the print job on which the font registration process is performed. A button 704 is an OK button to store the settings made on the font registration job setting screen 700 and to transition to the font registration image reading screen 800 illustrated in FIG. 8. A button 705 is a cancel button to transition to the font list screen 600 illustrated in FIG. 6 without storing the settings on the font registration job setting screen 700.

Figure 8:
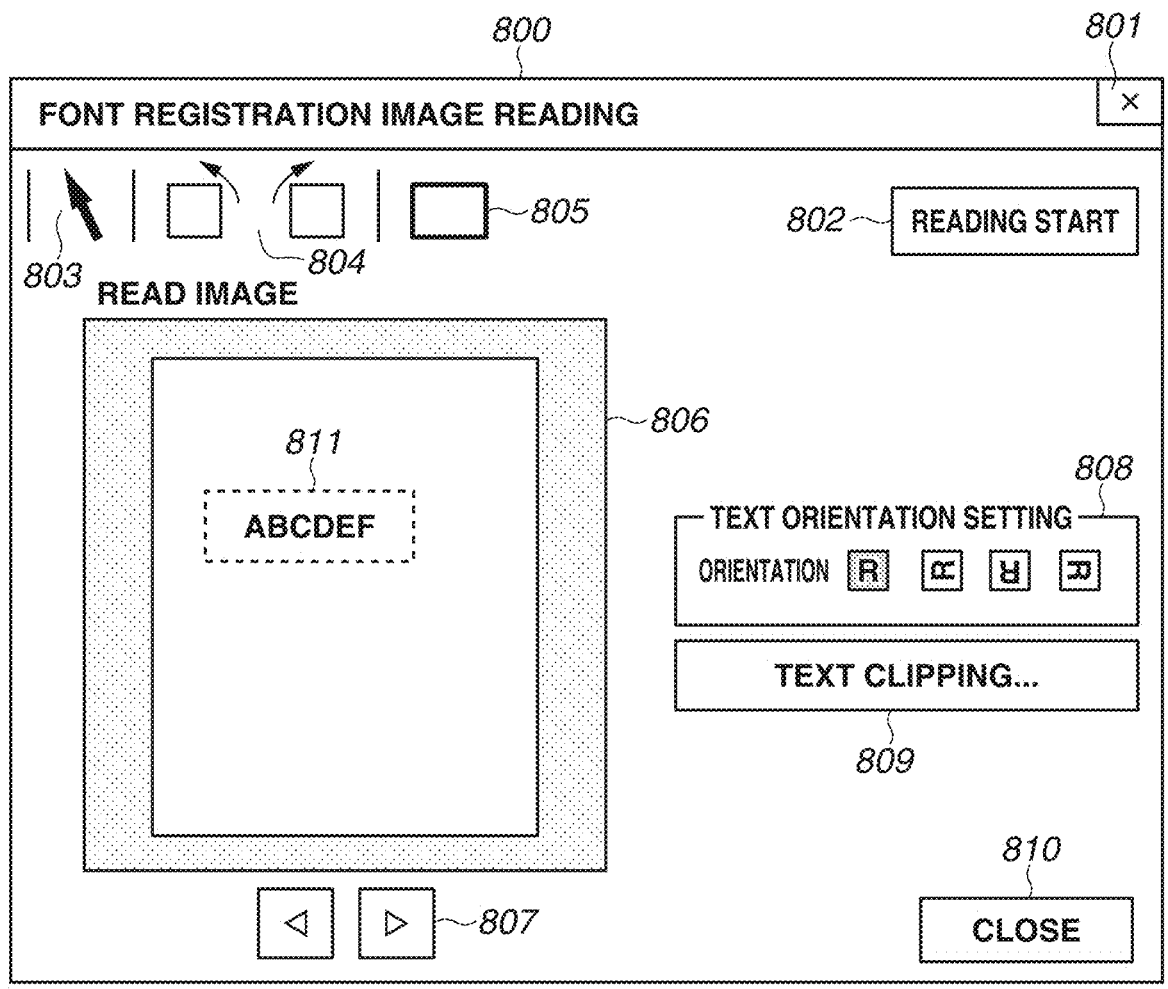
FIG. 8 illustrates an example of a UI screen for font registration image reading according to the first exemplary embodiment.

FIG. 8 illustrates an example of a screen to be displayed on the UI unit 320 of the inspection apparatus 110 to register the reference image.

A button 801 is used to hide the font registration image reading screen 800. When the button 801 is pressed, the screen transitions to the font registration job setting screen 700 illustrated in FIG. 7.

The font registration image reading screen 800 illustrated in FIG. 8 may be configured to be displayed in a superimposed manner on the font registration job setting screen illustrated in FIG. 7. A button 802 is used to start reading of a font registration image. When the button 802 is pressed, the inspection apparatus 110 is brought into a reading standby state, and when a sheet is conveyed from the image forming apparatus 100, the inspection apparatus 110 acquires the scanned image. A button 803 is used to select an inspection area. If the operator wishes to select the already set area, the operator presses the button 803.

Buttons 804 are used to rotate an image displayed on an area 806. A button 805 is pressed by the operator to create an area where a new font is to be registered. After the button 805 is pressed, the operator sets the registration area on the image displayed on the area 806.

An area 811 is an example of the set registration area. If a plurality of sheets is to be read, buttons 807 are used to switch the image to be displayed. The buttons 807 are also used to switch the display of the front and back surfaces of the read sheet. A setting item 808 is an item to set the orientation of the registration area 811 created by pressing the button 805. In this case, the same orientation as the orientation of a character string included in the registration area 811 is set. By setting the orientation, the font registration process is performed on the image in a state where the characters are upright. A button 809 is a text clipping button to divide the area of the character string into single character areas in the registration area created by pressing the button 805 and to associate each single character area with a character code.

Figure 9:
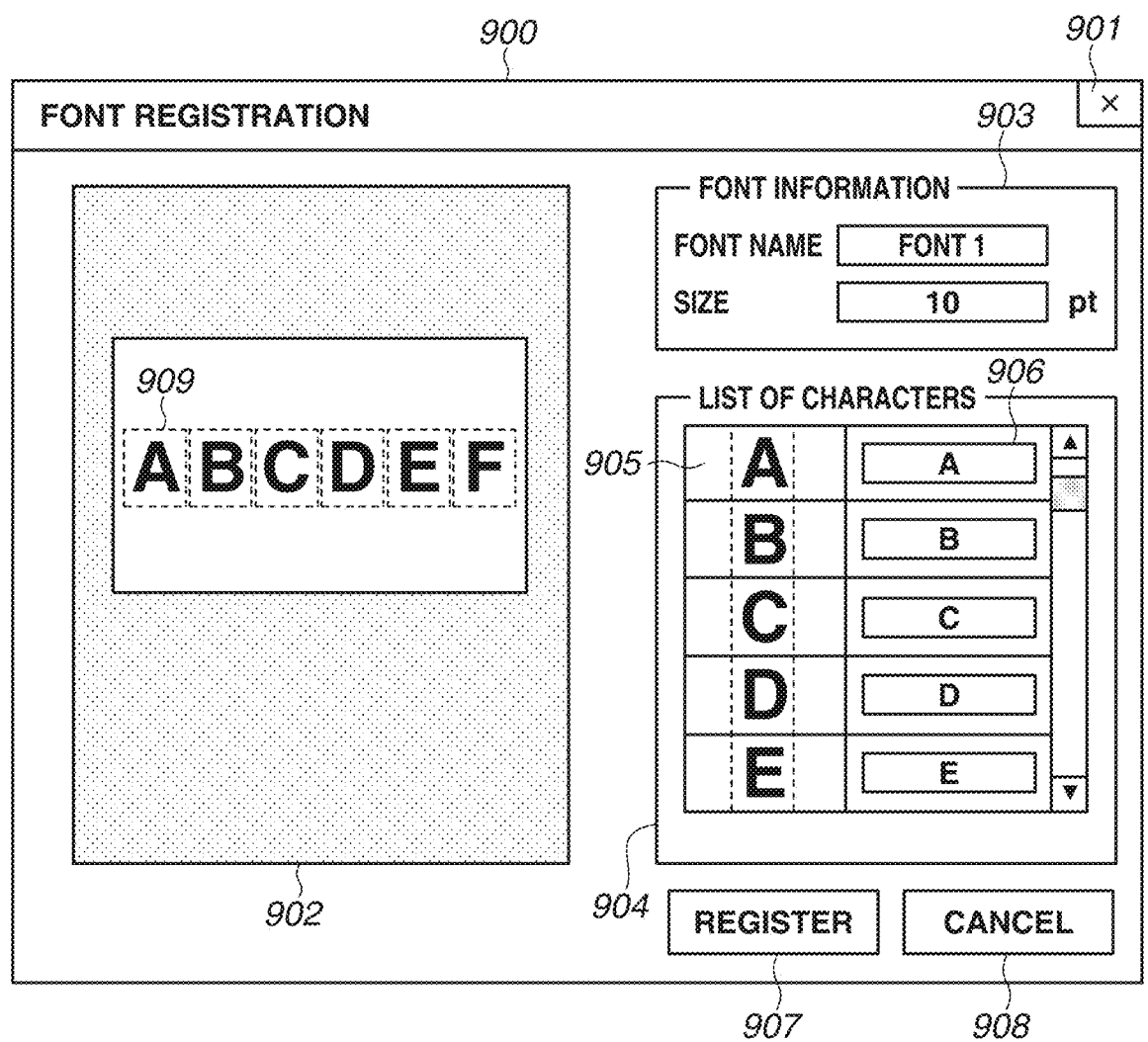
FIG. 9 illustrates an example of a UI screen for font registration according to the first exemplary embodiment.

When the button 809 is pressed, the screen transitions to the font registration screen 900 illustrated in FIG. 9. A button 810 is used to hide the font registration image reading screen 800. When the button 810 is pressed, the screen transitions to the font registration job setting screen 700 illustrated in FIG. 7.

FIG. 9 illustrates an example of a screen to be displayed on the UI unit 320 of the inspection apparatus 110 to perform the font registration process. A button 901 is used to hide the font registration screen 900. When the button 901 is pressed, the screen transitions to the font registration image reading screen 800 illustrated in FIG. 8. The font registration screen 900 illustrated in FIG. 9 may be configured to be displayed in a superimposed manner on the font registration image reading screen 800 illustrated in FIG. 8.

An area 902 is an area to display the image corresponding to the registration area 811 illustrated in FIG. 8. A setting item 903 is an item to set information about the font to be registered. In the present exemplary embodiment, a font name and a font size are set in the setting item 903. However, the setting in the setting item 903 is not limited to this example, and any setting item that facilitates the operator to select a font during the inspection setting process may be used. An area 904 is an area to display a list of divided areas for each of the characters included in the registration area 811. An area 905 is an area to display the image of the divided areas for each character and to display the image of the divided areas for each character as illustrated in a divided area 909.

A setting area 906 is used to set a character code. If an image "A" is displayed on the area 905, the operator sets a character code "A". Thus, each character image obtained by dividing the character string into single character areas is associated with the corresponding character code. OCR processing is performed on the read image during the inspection process based on the associated information.

A button 907 is used to associate each character image set on the area 904 with the corresponding character code and to register font information set in the setting item 903. When the button 907 is pressed, the screen transitions to the font list screen 600 illustrated in FIG. 6, and the registered information is added to the font list 604. A button 908 is a cancel button to transition to the font registration image reading screen 800 illustrated in FIG. 8, without storing the setting made on the area 904 and the setting values in the setting item 903.

The reference image registration process will now be described with reference to FIG. 10 and FIGS. 11A and 11B.

Figure 10:
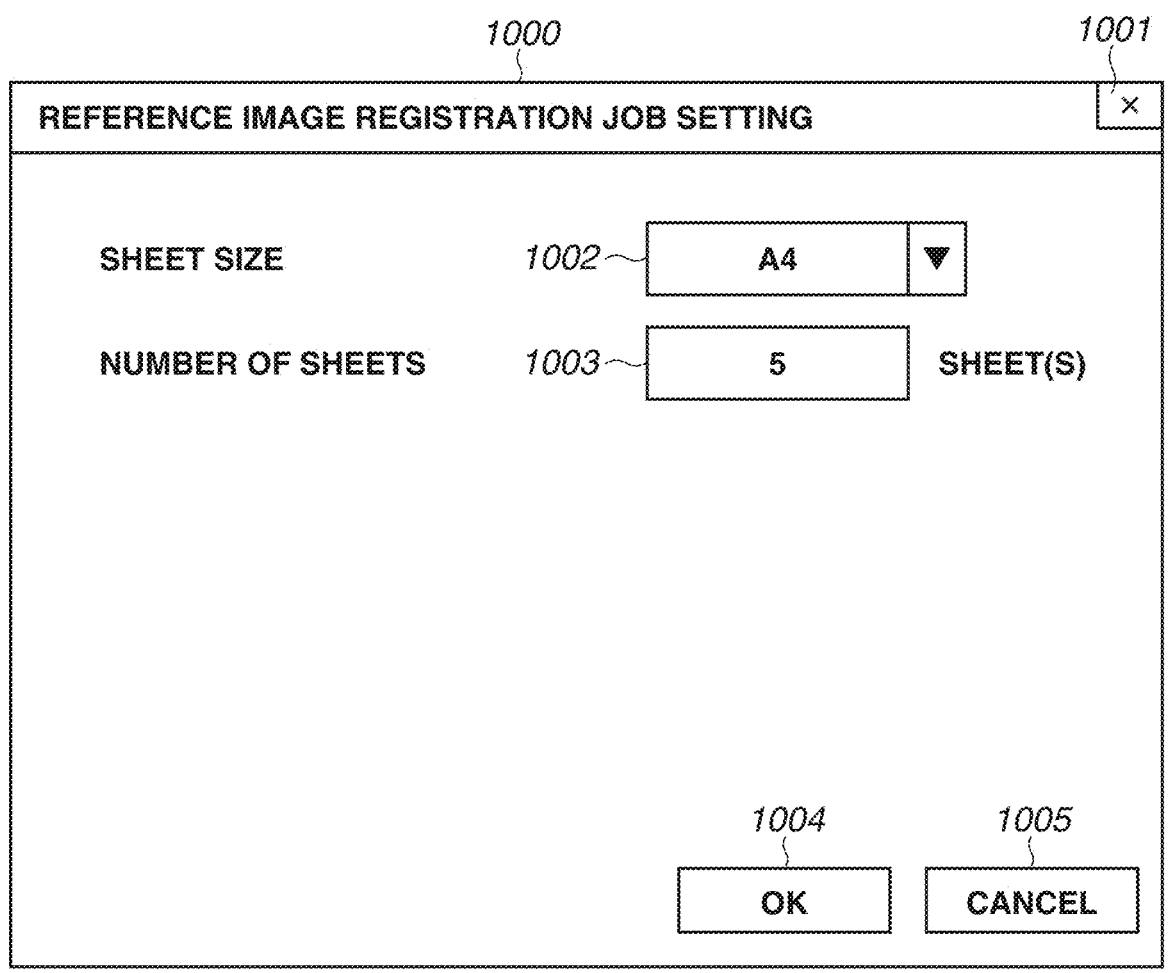
FIG. 10 illustrates an example of a UI screen for reference image registration job setting according to the first exemplary embodiment.

FIG. 10 illustrates an example of a screen to be displayed on the UI unit 320 of the inspection apparatus 110 to make reference image registration job settings. In this case, the size of each sheet and the number of sheets are set to register a new reference image.

A button 1001 is used to hide the reference image registration job setting screen 1000. When the button 1001 is pressed, the screen transitions to the job management screen illustrated in FIG. 5. The reference image registration job setting screen 1000 illustrated in FIG. 10 may be configured to be displayed in a superimposed manner on the job management screen 500 illustrated in FIG. 5. A setting area 1002 is used to set the sheet size for the print job on which the reference image registration process is performed.

A setting area 1003 is used to set the number of sheets per copy for the print job on which the inspection process is performed. In the print job to print two or more sheets are printed per copy, a plurality of images can be registered as the correct answer image. A button 1004 is an OK button to store the settings made on the reference image registration job setting screen 1000 and to transition to a reference image registration screen 1100 illustrated in FIGS. 11A and 11B. A button 1005 is a cancel button to transition to the job management screen 500 illustrated in FIG. 5, without storing the settings made on the reference image registration job setting screen 1000.

FIG. 11A illustrates an example of a screen to be displayed on the UI unit 320 of the inspection apparatus 110 to register the reference image. A button 1101 is used to hide the reference image registration screen 1100.

When the button 1101 is pressed, the screen transitions to the reference image registration job setting screen 1000 illustrated in FIG. 10. The reference image registration screen 1100 illustrated in FIG. 11A may be configured to be displayed in a superimposed manner on the reference image registration job setting screen 1000 illustrated in FIG. 10.

A button 1102 is used to start reading of the reference image. When the button 1102 is pressed, the inspection apparatus 110 is brought into the reading standby state. The image reading unit 310 is used to execute scanning on the printed material conveyed from the image forming apparatus 100 and acquire the scanned image. An area 1103 is an area to display the scanned image on the printed sheet, and nothing is displayed on the area 1103 before reading is started. When the scanned image is acquired, the read image is displayed on the area 1103. If a plurality of sheets is to be read, a button 1104 is used to switch the image to be displayed. The button 1104 is also used to switch the display of the front and back surfaces of the read sheet.

A button 1105 is used to register the read image as the reference image. When reading is completed, the button 1105 can be pressed. A button 1106 is a cancel button to transition to the reference image registration job setting screen 1000 illustrated in FIG. 10, without registering the read image as the reference image.

Figure 11B:
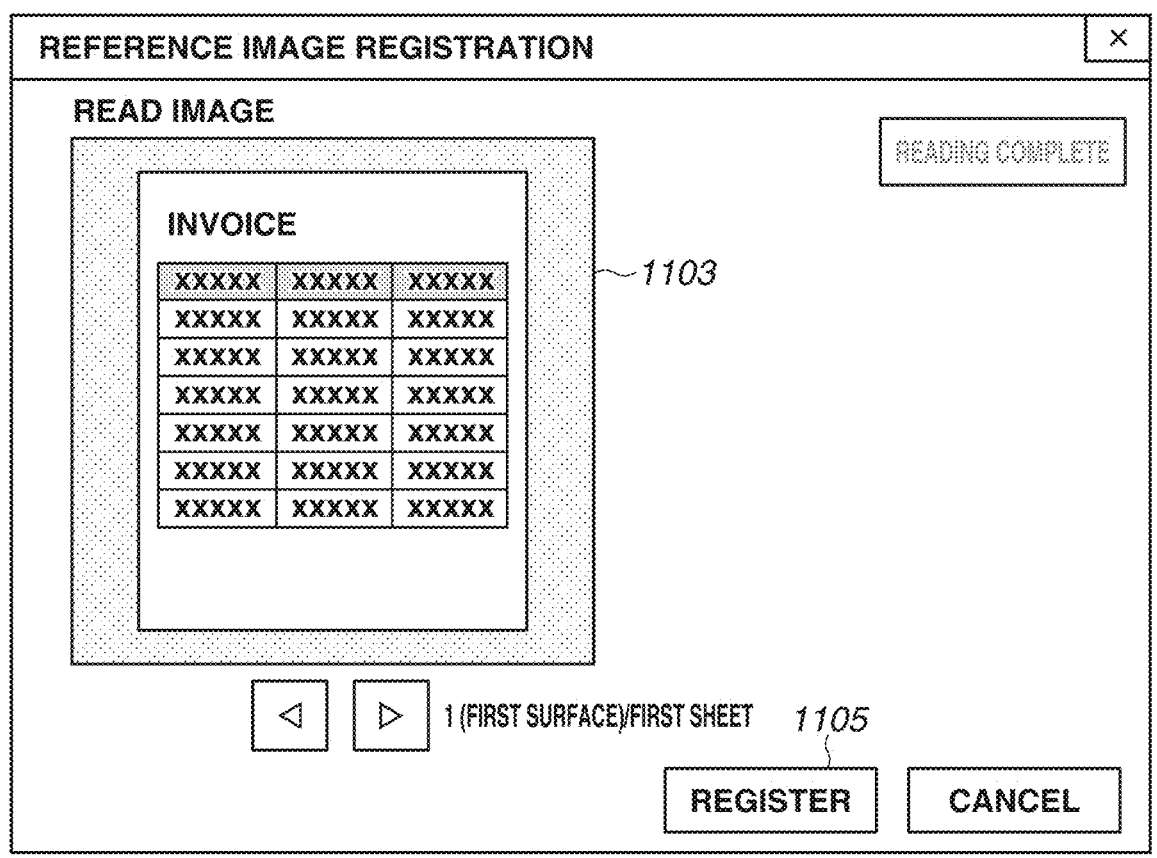

FIG. 11B illustrates an example of the reference registration image screen 1100 to be displayed after reading of the reference image is completed. Descriptions of components identical to those illustrated in FIG. 11A are herein omitted. A preview of the read image is displayed on the area 1103, so that the button 1105 can be pressed. When the button 1105 is pressed, the screen transitions to an inspection setting screen 1200 illustrated in FIGS. 12-1A to 12-2B.

The inspection setting process will now be described with reference to FIGS. 12-1A to 12-2B.

Figures 1A, 12:
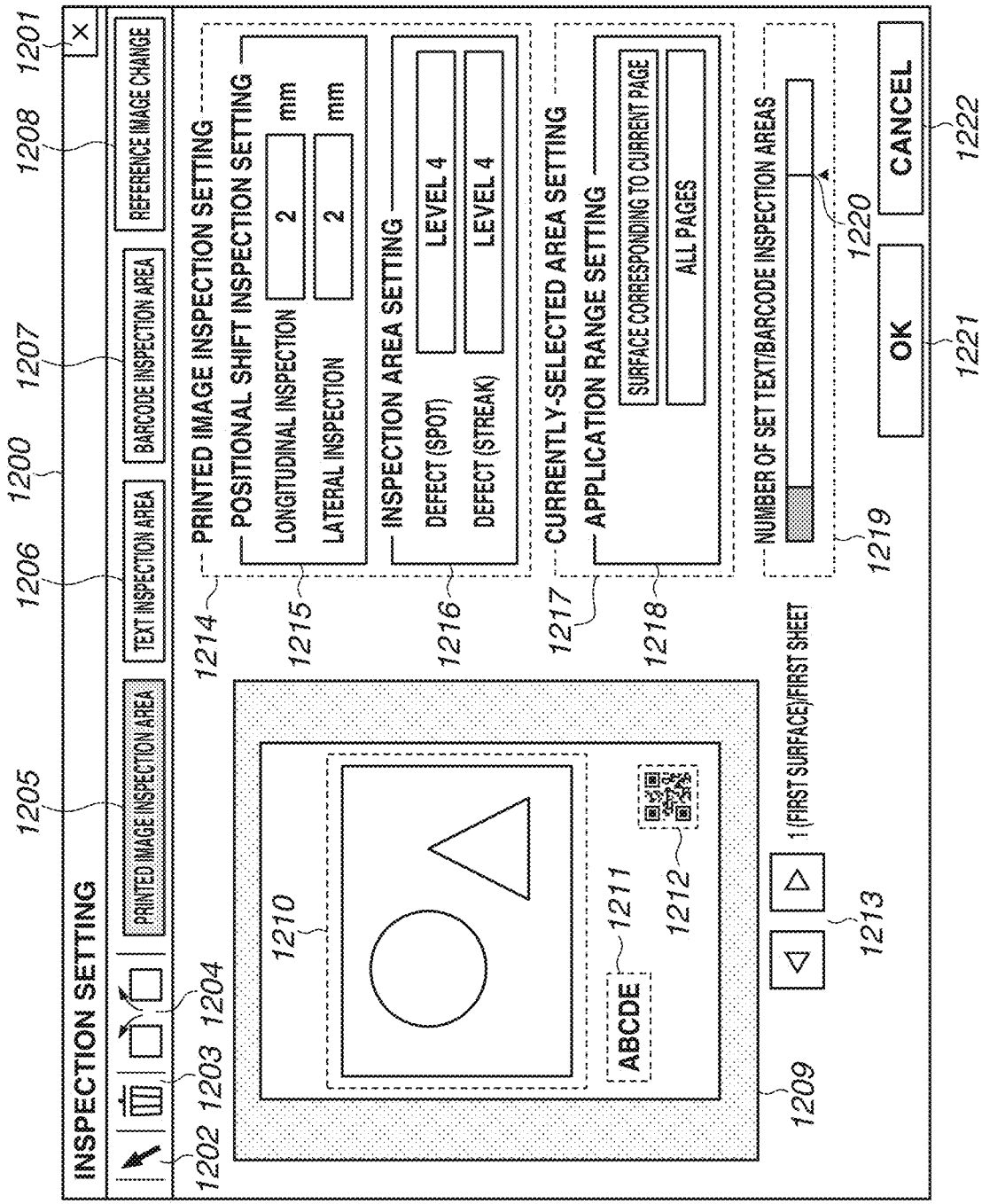
FIGS. 12-1A and 12-1B each illustrate an example of a UI screen for inspection setting according to the first exemplary embodiment.

FIG. 12-1A illustrates an example of a screen to be displayed on the UI unit 320 of the inspection apparatus 110 to perform the inspection setting process.

A button 1201 is used to hide the inspection setting screen 1200. When the button 1201 is pressed, the screen transitions to the job management screen 500 illustrated in FIG. 5. A button 1202 is used to select an inspection area. If the operator wishes to select the already set area, the operator presses the button 1202. A button 1203 is used to delete an inspection area. If the operator wishes to delete the selected area, the operator presses the button 1203. Buttons 1204 are used to rotate an image displayed on an area 1209.

A button 1205 is a button to be pressed by the operator to create a new printed image inspection area. After the button 1205 is pressed, the operator sets the inspection area on the reference image displayed as a preview image on the area 1209. For example, an area 1210 including a circular object and a triangular object is set by the operator. The area 1210 indicates an example of the set printed image inspection area. A button 1206 is a button to be pressed by the operator to create a new text inspection area. After the button 1206 is pressed, the operator sets the inspection area on the reference image displayed on the area 1209. For example, an area 1211 including an object in which "ABCDE" is described is set by the operator. The area 1211 indicates an example of the set text inspection area.

A button 1207 is a button to be pressed by the operator to create a new barcode inspection area. After the button 1207 is pressed, the operator sets the inspection area on the reference image displayed on the area 1209. For example, an area 1212 including a decodable object such as quick response (QR) Code® is set by the operator. The area 1212 indicates an example of the set barcode inspection area. A button 1208 is a reference image change button used to change the reference image. When the button 1208 is pressed, the screen transitions to the reference image registration screen 1100 illustrated in FIG. 11A.

The area 1209 is a display area to display the read reference image. If a plurality of sheets is to be read, buttons 1213 are used to switch the image to be displayed. The buttons 1213 are also used to switch the front and back surfaces of the read sheet. A setting area 1214 is a UI group to set the level of a defect to be detected when the printed image inspection is performed. Printed image inspection detection items relate to the features of each defect to be detected during the inspection on the printed material. The setting area 1214 is displayed when the printed image inspection area is currently selected.

A setting item 1215 is a positional shift inspection setting item to set a shift amount of a print position from the reference image. The present exemplary embodiment illustrates an example where the operator designates the shift amount to detect a positional shift of 2 mm or more. A setting item 1216 is an item to set the detection level of each defect, such as a circular defect (spot) or a linear defect (streak). The term "detection level" refers to a parameter set for each level to determine each defect based on the size of each defect depending on the features of the detected defect. For example, there are five detection levels, i.e., levels 1 to 5. A defect that can be detected at the level 5 is thinner and smaller than a defect that can be detected at the level 1. The detection levels can be set for each inspection item. For example, a spot defect can be detected at the inspection level 5, and a streak defect can be detected at the inspection level 4. The setting item 1216 indicates that the operator has selected the level 4 as the inspection level for the defect (spot) and the level 4 as the inspection level for the defect (streak). A setting area 1217 is a UI group to make settings on the currently-selected area on the area 1209.

A setting item 1218 is used to set the application range of the selected area. If nothing is selected in the setting item 1218, the currently-selected inspection area is located only on the page currently displayed on the area 1209. If the "surface corresponding to the current page" is selected, the currently-selected inspection area is located on the page of the same surface depending on whether the currently-selected inspection area is located on the front surface or the back surface of the sheet. If "all pages" are selected, the currently-selected inspection area is located on all pages. An area 1219 indicates the number of set text areas and barcode areas that are set on the currently displayed page on the area 1209. In the present exemplary embodiment, the number of set areas is displayed as a bar graph. However, the display form is not limited to this example. Any display form, such as a graph or display of numeric values, can be used as long as the operator can recognize the number of set inspection areas. Thus, the number of set inspection areas is displayed as a bar graph or the like, thereby enabling the operator to recognize how many areas can be additionally set and to recognize, for example, which area is to be deleted when the number of set areas exceeds the number of settable areas so that the number of set areas can fall within the number of settable areas.

A display 1220 indicates the number of areas that can be set on one page. Setting of areas more than the number of areas indicated by the display 1220 means that the number of areas exceeds a limited number of areas to be inspected. In the present exemplary embodiment, the display 1220 uses a line displayed on a bar graph and a triangular graphic located below the bar graph. However, the display form is not limited to this example. For example, another graphic or the number of areas that can be set may be displayed in place of the triangular arrow. The display form is not particularly limited as long as the upper limit of the number of areas that can be set is displayed such that a user can recognize the upper limit. A button 1221 is an OK button to store the settings made on the inspection setting screen 1200 and to transition to the inspection job setting screen 1300 illustrated in FIG. 13.

A button 1222 is a cancel button to transition to the job management screen 500 illustrated in FIG. 5 in a state where the settings made on the inspection setting screen 1200 are not stored and only the reference image is stored.

Figures 1B, 12:
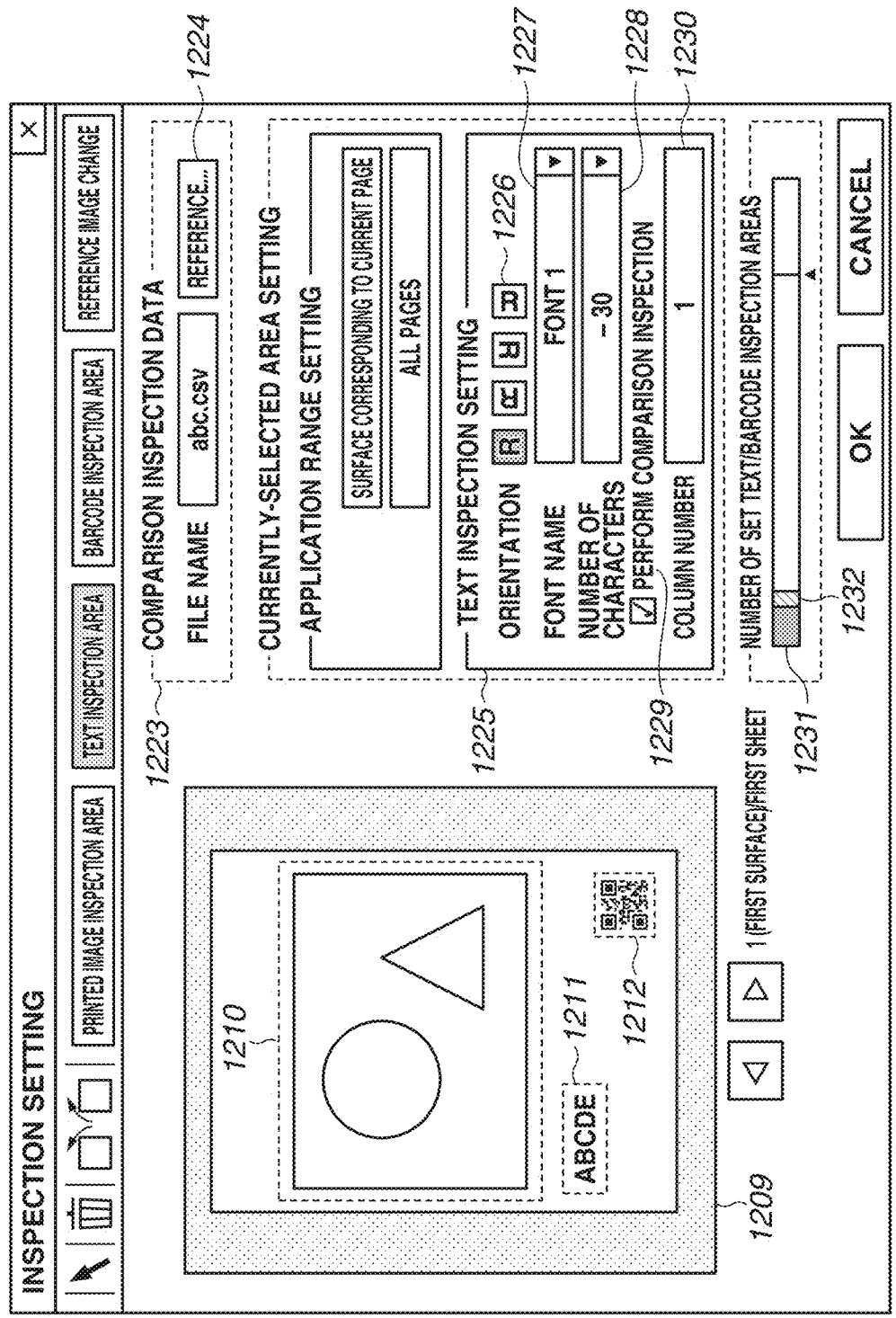

FIG. 12-1B illustrates another example of the inspection setting screen 1200 when a text area is selected as the code type in the currently-selected setting area. In this case, the code type is information indicating at least the character type or the barcode type. Descriptions of components identical to those illustrated in FIG. 12-1A are herein omitted.

Assume herein that the text area 1211 is currently selected.

A setting area 1223 is used to set a correct answer CSV file to be compared when the comparison inspection is performed. The correct answer CSV file is selected by pressing a button 1224, and the name of the selected file is displayed. The correct answer CSV file is commonly designated in the text inspection and the barcode inspection. In the present exemplary embodiment, one correct answer CSV file can be referred to. However, a configuration may be used in which a plurality of correct answer CSV files can be designated.

A setting area 1225 is used to make settings on the currently-selected text area. In this case, settings for the orientation and font of each character, the number of characters, whether to perform the comparison inspection, and a column number to be designated in the correct answer CSV file during the comparison inspection are made.

Setting items 1226 are used to set the orientation of each character included in the text area 1211. A setting item 1227 is used to set a font for OCR processing on the text area 1211. In this case, one of the fonts registered in the font list 604 illustrated in FIG. 6 is selected. A setting item 1228 is used to designate the number of characters to be printed on the text area 1211. A setting item 1229 is used to set information indicating whether to perform the comparison inspection. If the comparison inspection "ON" is set, OCR processing on the text area 1211 is performed using the correct answer CSV file designated in the setting area 1223 and the column number designated in the setting item 1230, and the comparison inspection is performed by comparing the read character string with the character string designated in the correct answer CSV file.

An element 1231 indicates the sum of set text and barcode inspection areas other than the currently-selected area. Specifically, when a third area is currently set, the sum of first and second areas is displayed in the element 1231.

An element 1232 indicates the number of areas used in the currently-selected text area 1211. Specifically, when the third area is currently set, the third area and the areas set in the element 1231 are displayed in such a manner that the third area and the areas set in the element 1231 are individually recognizable. The total of the areas set in the element 1231 and the areas set in the element 1232 indicates the sum of the text and barcode inspection areas set on the image displayed on the area 1209.

Figures 2A, 12:
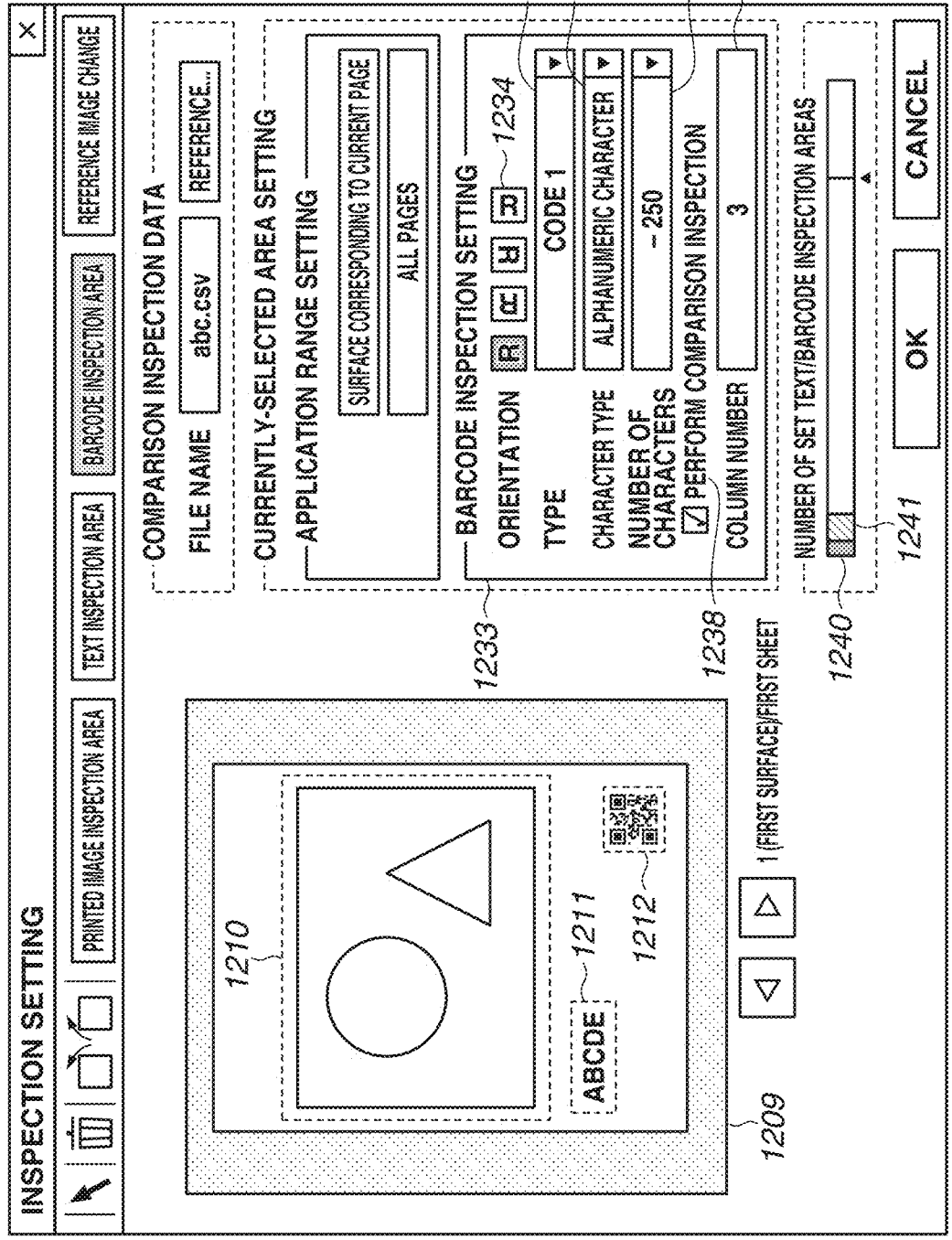

FIG. 12-2A illustrates still another example of the inspection setting screen 1200 when the barcode area is currently selected as the setting area. Descriptions of components identical to those illustrated in FIGS. 12-1A and 12-1B are herein omitted.

Assume herein that the barcode area 1212 is currently selected.

A setting area 1233 is used to make settings on the currently-selected barcode area. In this case, settings for the orientation and type of each code, the number of characters, whether to perform the comparison inspection, and a column number to be designated in the correct answer CSV file during the comparison inspection are made.

A setting item 1234 is used to set the code orientation in the barcode area 1212.

A setting item 1235 is used to select the type of a barcode to be used in the barcode area 1212. In this case, any one of the barcode types registered in advance is selected.

A setting item 1236 is used to designate the type of each character used when the code used in the barcode area 1212 is decoded. In this case, for example, "number", "alphanumeric character", and "Chinese character" are set.

A setting item 1237 is used to designate the number of characters in the code content to be printed on the barcode area 1212.

A setting item 1238 is used to set whether to perform the comparison inspection and a setting item 1239 is used to set a column number for comparison in the correct answer CSV file, like in the text area.

An element 1240 indicates the sum of the set text and barcode inspection areas other than the currently-selected area.

An element 1241 indicates the number of areas used in the currently-selected barcode area 1212. The total number of the areas set in the element 1240 and the areas set in the element 1241 indicates the sum of the text and barcode inspection areas set in the image displayed on the area 1209. The total value is the same as the total value of the element 1231 and the element 1232 illustrated in FIG. 12-1B. FIG. 12-2B will be described below.

The inspection setting process will now be described with reference to FIG. 13 and FIGS. 14A and 14B.

Figure 13:
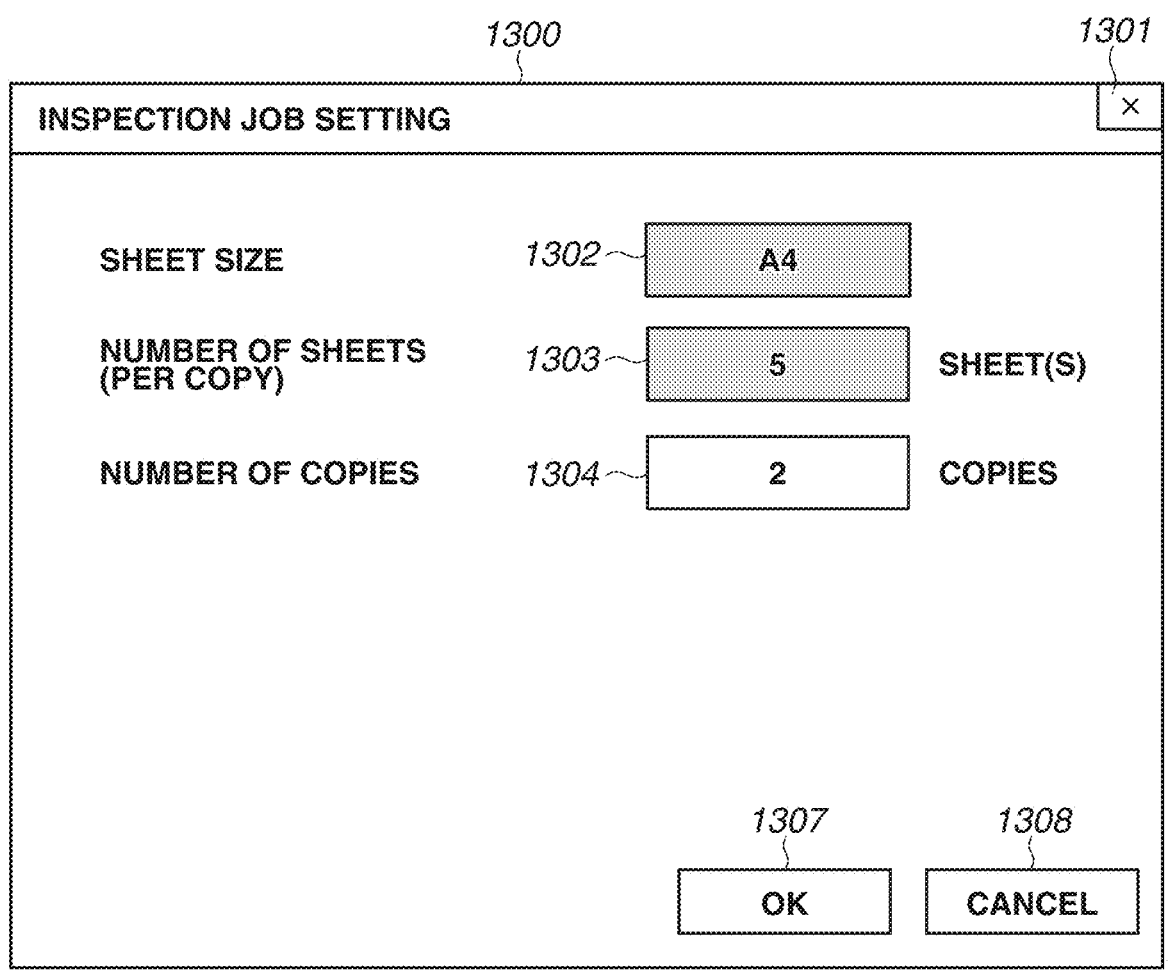
FIG. 13 illustrates an example of a UI screen for inspection job setting according to the first exemplary embodiment.

FIG. 13 illustrates an example of a screen to be displayed on the UI unit 320 of the inspection apparatus 110 to make inspection job settings.

A button 1301 is used to hide the inspection job setting screen 1300. When the button 1301 is pressed, the screen transitions to the job management screen 500 illustrated in FIG. 5.

A setting area 1302 indicates the sheet size for the print job on which the inspection process is performed. The sheet size is set during the reference image registration process. Accordingly, the sheet size is displayed on this screen, but the setting value of the sheet size cannot be changed on this screen.

A setting area 1303 indicates the number of sheets per copy in the print job on which the inspection process is performed. The number of sheets per copy is set during the reference image registration process. Accordingly, the number of sheets per copy is displayed on this screen, but the setting value of the number of sheets per copy cannot be changed on this screen.

A setting area 1304 is used to set the number of copies for the print job on which the inspection process is performed.

Figure 14A:
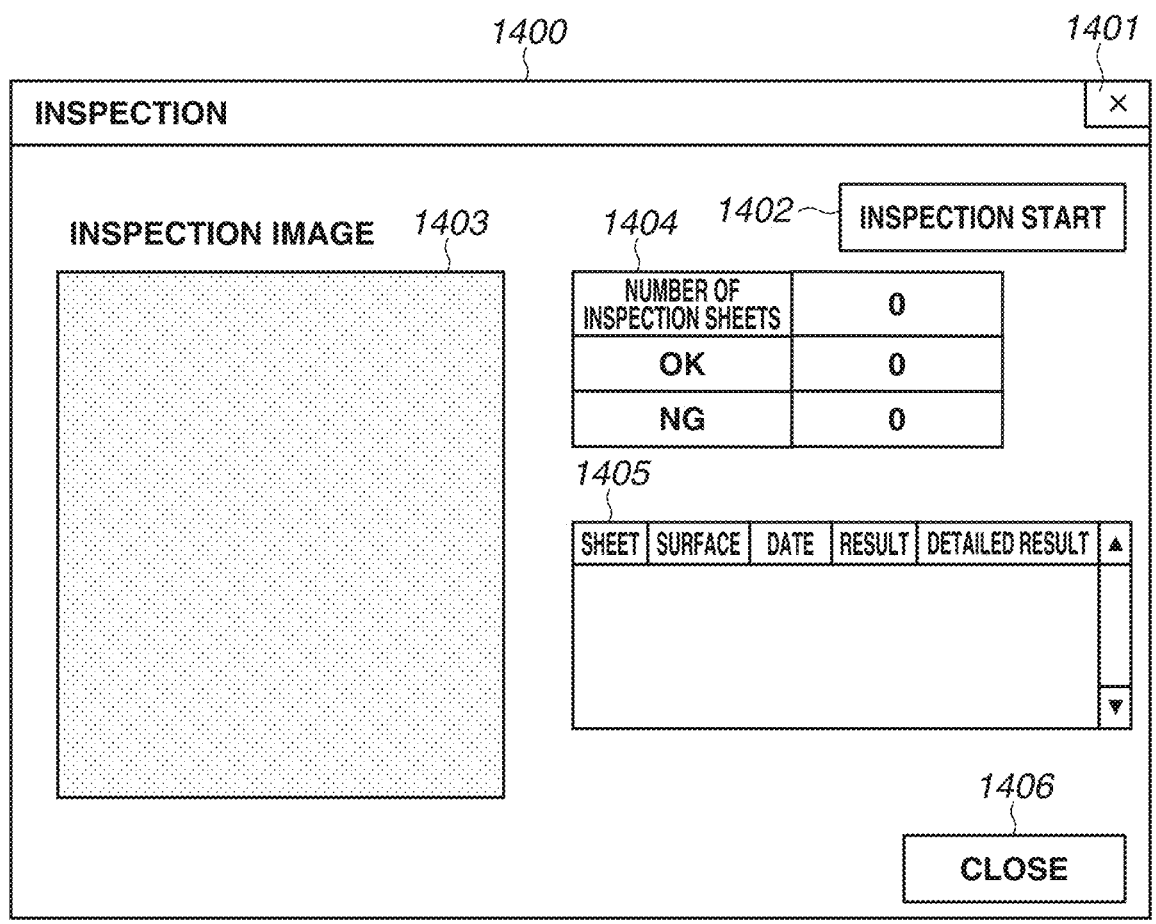
FIGS. 14A and 14B each illustrate an example of a UI screen for inspection according to the first exemplary embodiment.
Figure 14B:
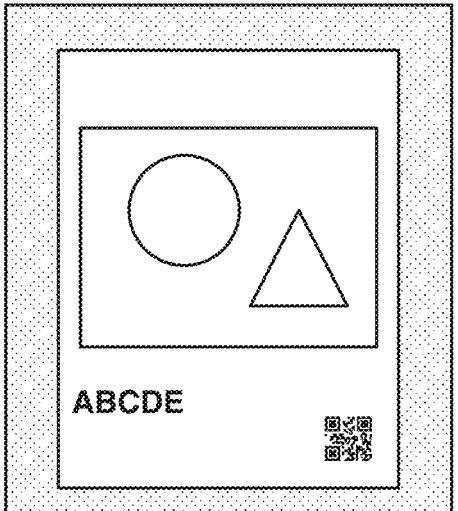

A button 1307 is an OK button to store the settings made on the inspection job setting screen 1300 and to transition to an inspection screen 1400 illustrated in FIGS. 14A and 14B.

A button 1308 is a cancel button to transition to the job management screen 500 illustrated in FIG. 5, without storing the settings made on the inspection job setting screen 1300.

FIG. 14A illustrates an example of a screen to be displayed on the UI unit 320 of the inspection apparatus 110 during the inspection process.

A button 1401 is used to hide the inspection screen 1400. When the button 1401 is pressed, the screen transitions to the job management screen 500 illustrated in FIG. 5.

A button 1402 is used to start reading of the inspection image.

An area 1403 is an area to display the image of the read printed sheet, and nothing is displayed on the area 1403 before the inspection process is started.

An area 1404 is an area to display the inspection result. An area 1405 is an area to display the inspection result for each surface of the inspection sheet. If the inspection "NG" is displayed, the detailed result indicating the cause for "NG" is also displayed. In the present exemplary embodiment, the number of inspection processes, the number of items indicating "OK", and the number of items indicating "NG" are displayed. However, the display items are not limited to this example, and any display item can be displayed as long as the operator can easily recognize the inspection result.

A button 1406 is used to store the inspection result and to complete the inspection process. When the button 1406 is pressed, the screen transitions to the job management screen 500 illustrated in FIG. 5.

FIG. 14B illustrates another example of the inspection screen 1400 to be displayed after reading of the inspection sheet is completed.

Figure 15:
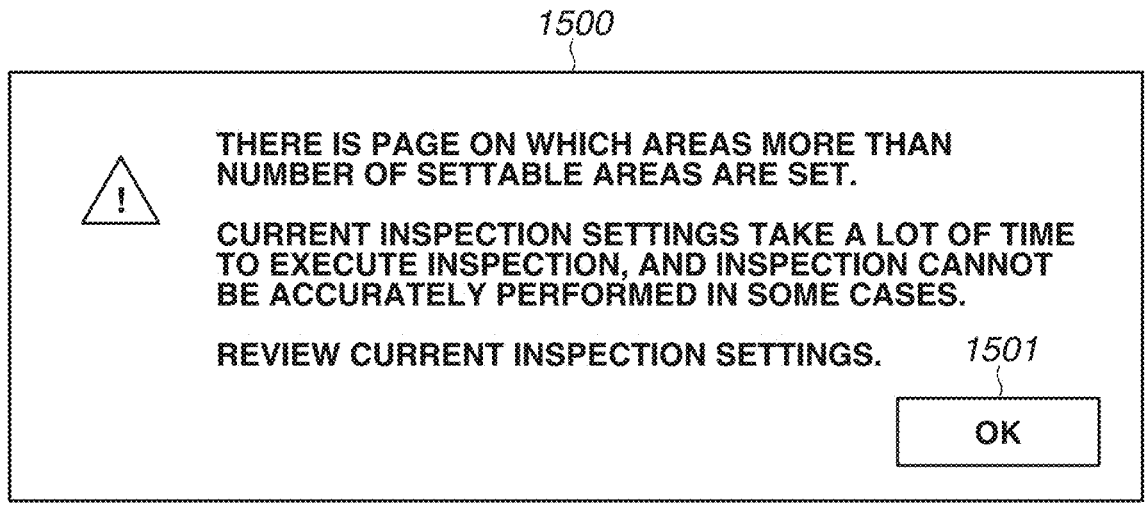
FIG. 15 illustrates an example of a warning message screen according to the first exemplary embodiment.

The read image is displayed on the area 1403, and the inspection result is displayed on each of the area 1403 and the area 1404. FIG. 15 will be described below.

<Overall Inspection Flow>

An overall processing flow from a registration work before the inspection process is started to execution of the inspection process in the inspection apparatus 110 will now be described with reference to a flowchart illustrated in FIG. 4.

This flowchart is implemented if a program code stored in the ROM 304 is loaded to the RAM 303 and the program code is executed by the CPU 302.

In step S401, the CPU 302 stores the font registration job setting. In this case, the information set on the font registration job setting screen 700 illustrated in FIG. 7 is stored in the RAM 303 of the inspection apparatus 110.

In step S402, the CPU 302 registers font information. When the button 802 is pressed on the font registration image reading screen 800 illustrated in FIG. 8, the CPU 302 brings the inspection apparatus 110 into the reading standby state. When the printed sheet is conveyed to the inspection apparatus 110, the CPU 302 performs image capturing processing on the printed sheet. The captured image is displayed on the area 806 illustrated in FIG. 8. When the text area to be registered is set and the button 809 is pressed, the CPU 302 performs text clipping and displays the font registration screen 900 illustrated in FIG. 9. When the button 907 is pressed, the CPU 302 stores the font image, the character code, and the font information in the RAM 303 of the inspection apparatus 110.

In step S403, the CPU 302 stores the reference image registration job setting. In this case, the information set on the reference image registration job setting screen 1000 illustrated in FIG. 10 is stored in the RAM 303 of the inspection apparatus 110.

In step S404, the CPU 302 registers the reference image. When the button 1102 is pressed on the reference image registration screen 1100 illustrated in FIG. 11A, the CPU 302 brings the inspection apparatus 110 into the reading standby state. When the printed sheet is conveyed to the inspection apparatus 110, the CPU 302 performs image capturing processing on the printed sheet. The captured image is displayed on the area 1103 illustrated in FIG. 11A. When the button 1105 is pressed, the CPU 302 stores the captured image as the reference image in the RAM 303 of the inspection apparatus 110.

Figures 2B, 12:
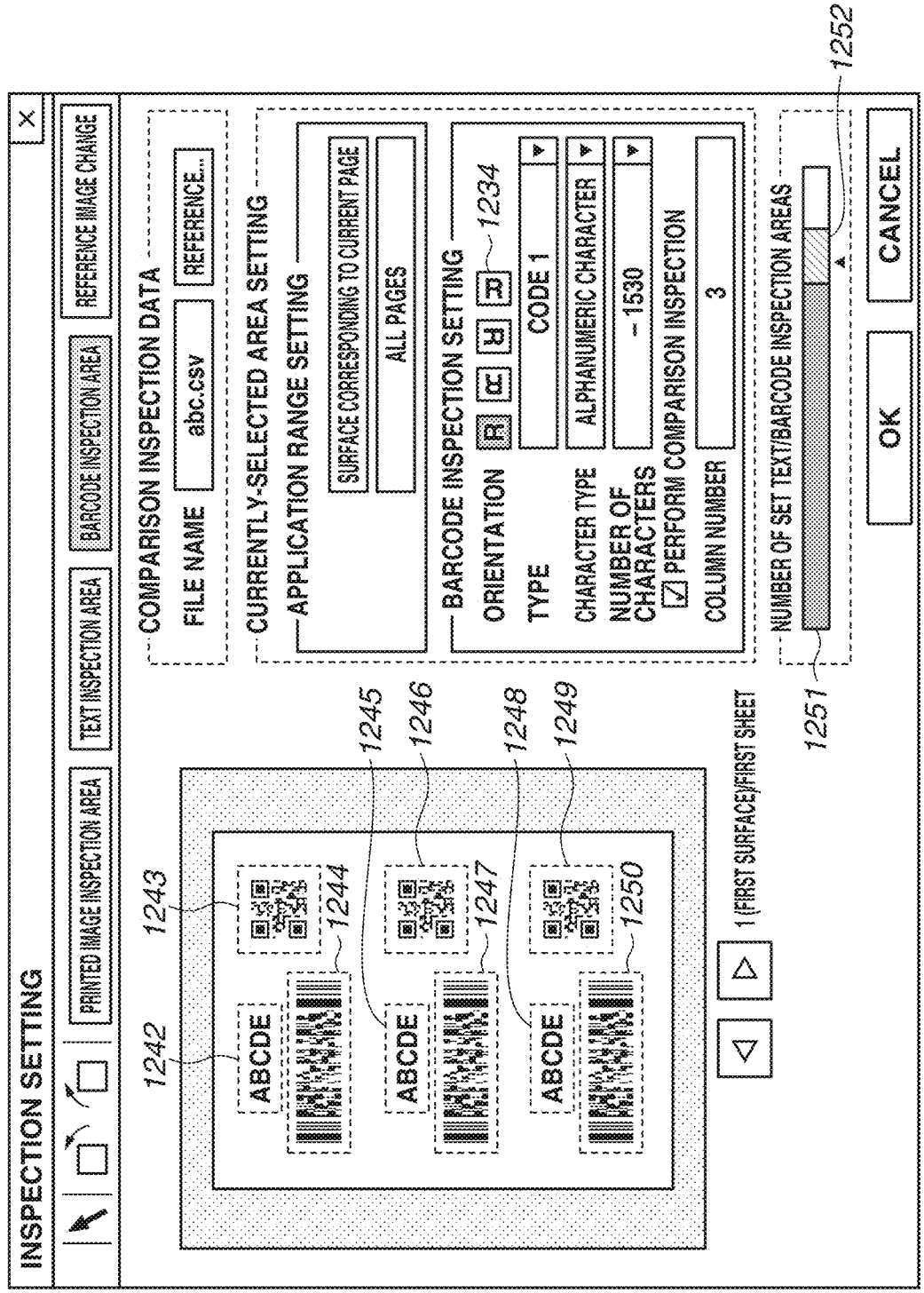

In step S405, the CPU 302 stores various inspection setting values, such as the inspection area and the inspection level, in the RAM 303 of the inspection apparatus 110 based on the inspection settings made by the operator on the inspection setting screen 1200 illustrated in FIGS. 12-1A to 12-2B. The processing of step S405 according to the present exemplary embodiment will be described in detail below.

In step S406, the CPU 302 determines whether the total number of set areas on all pages on which the inspection settings are made in step S405 is less than or equal to the number of settable areas calculated in step S1602. In the present exemplary embodiment, the total number of set areas does not indicate the counted number of areas set in the area 1211, the area 1212, or the like illustrated in FIG. 12-1A. The total number of set areas indicates the number of text inspection areas and barcode areas on each page set in step S405. The number of settable areas is the number of areas that can be set on each page. The total number of set areas and the number of settable areas will be described in detail below.

FIG. 12-2B illustrates an example where the number of text areas and barcode areas to be inspected exceeds the number of settable areas. Assume that the number of areas used in each of an area 1242, an area 1245, and an area 1248 is "1", and the number of areas used in each of an area 1243, an area 1244, an area 1246, an area 1247, an area 1249, and an area 1250 is "5". The following description is made assuming that the area 1250 is the last area set by the operator.

An element 1251 indicates the sum of areas used in the areas other than the area 1250. An element 1252 indicates the number of areas to be used in the area 1250. The total number of set areas on the currently displayed page corresponding to the sum of the areas set in the element 1251 and the areas set in the element 1251 is "33". When the read image is A4-size, the number of settable areas as the upper limit is "30" based on table information illustrated in FIG. 17. This indicates that the number of set areas exceeds the number of settable areas indicated by the area 1219. On the inspection setting screen 1200 illustrated in FIG. 12-2B, the number of settable areas "30" is represented by a black triangular mark. If the user incidentally performs inspection processing in this state, the inspection processing cannot be completed in time, which causes an inspection error.

In step S406, if it is determined that the total number of set areas is less than or equal to the number of settable areas (YES in step S406), the inspection setting process is completed without displaying any warning message. If the total number of set areas exceeds the number of settable areas in step S406 (NO in step S406), the processing proceeds to step S408.

In step S408, the CPU 302 displays on the UI unit 320 a warning message indicating that the total number of set areas exceeds the number of settable areas. FIG. 15 illustrates an example of a warning screen according to the present exemplary embodiment. If the total number of set areas exceeds the number of settable areas on at least one page, a screen 1500 is displayed. The screen 1500 displays information to prompt the user to review the inspection settings and displays a message to prompt the user to make inspection settings again and review the selected area. The above-described configuration makes it possible to prevent the occurrence of an inspection error due to inspection processing accidentally performed. A button 1501 is used to hide the screen 1500. When the button 1501 is pressed, the screen transitions to the inspection setting screen 1200 illustrated in FIGS. 12-1A to 12-2B. The screen 1500 illustrated in FIG. 15 may be configured to be displayed in a superimposed manner on the inspection setting screen 1200 illustrated in FIGS. 12-1A to 12-2B. The message to be displayed on the screen 1500 is not limited to this example.

In step S407, the CPU 302 stores the setting values set on the inspection job setting screen 1300 illustrated in FIG. 13 in the RAM 303 of the inspection apparatus 110.

In step S409, the CPU 302 executes the inspection process. When the inspection start button 1402 is pressed on the inspection screen 1400 illustrated in FIG. 14A, the CPU 302 brings the inspection apparatus 110 into the reading standby state. When the inspection sheet is conveyed to the inspection apparatus 110, the CPU 302 performs image capturing processing on the inspection sheet, and stores the scanned image in the RAM 303 of the inspection apparatus 110. The printed image inspection is performed using the scanned inspection image, the reference image registered in step S404, and the inspection setting values set in steps S405 and S407. Further, the text inspection and the barcode inspection are performed by using the font information registered in step S402, the barcode information registered in advance, and the inspection setting values set in step S405. Specifically, processing of comparing the character string read through OCR processing with the correct answer data prepared in advance is performed on the area 1211. Processing of comparing data read through decoding with the correct answer data prepared in advance is performed on the area 1212.

In the present exemplary embodiment, the warning screen is displayed after the inspection settings are completed. Specifically, after it is confirmed that the button 1221 is pressed on the inspection setting screen 1200 in step S1603 illustrated in FIG. 16, the processing proceeds to step S406 in FIG. 4. In step S406, it is determined whether the total number of set areas on all pages set for the inspection process in step S405 is less than or equal to the number of settable areas calculated in step S1602. If the total number of set areas on all pages is more than or equal to the number of settable areas (NO in step S406), the processing proceeds to step S408 to display a warning message. However, the warning message may be displayed during the inspection setting. This is because it is assumed that the warning message is displayed at a timing when the user sets inspection areas having more than the number of settable areas. For example, the screen 1500 may be displayed in a superimposed manner on the inspection setting screen illustrated in FIGS. 12-1A to 12-2B in a case where the display of the graph is updated in step S1611 illustrated in FIG. 16, the determination is performed in the same manner as described above in step S406, and the number of inspection areas is more than or equal to the number of settable areas. The method for displaying a warning message during the inspection setting is not particularly limited. For example, when the number of set inspection areas is more than or equal to the number of settable areas, the warning message may be displayed on the inspection setting screen 1200 illustrated in FIGS. 12-1A to 12-2B, or a bar graph may be displayed in a variable color. More alternatively, when the number of set inspection areas is more than or equal to the number of settable areas, the button 1221 illustrated in FIG. 12-1A to 12-2B may be, for example, grayed out to prevent the button 1221 from being pressed if the number of set inspection areas is more than the number of settable areas.

<Inspection Setting Flow>

Figure 16:
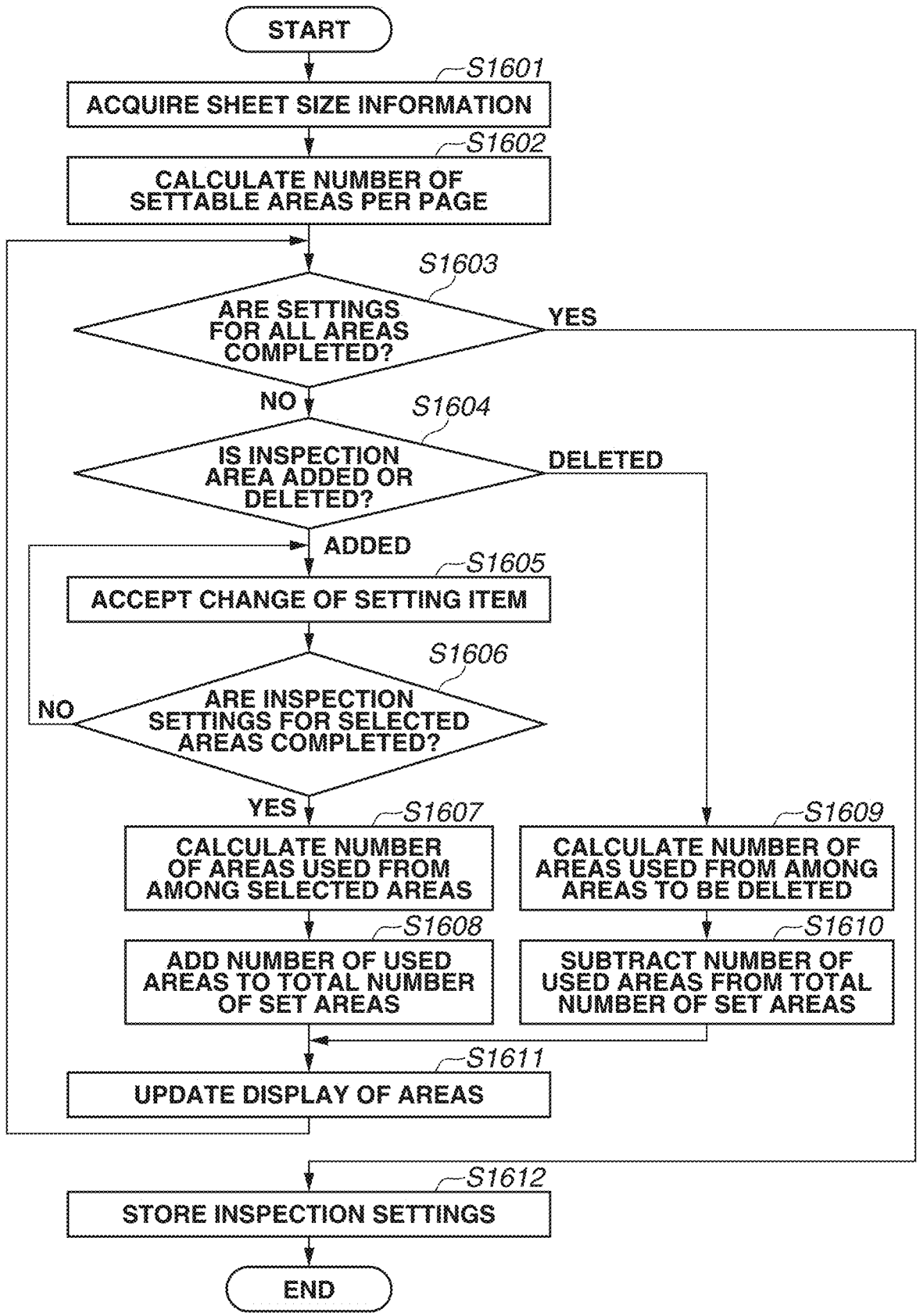
FIG. 16 illustrates an example of a flowchart for inspection setting in step S405 according to the first exemplary embodiment.

The inspection setting flow in step S405 will now be described in detail with reference to a flowchart illustrated in FIG. 16. This flowchart is implemented when a program code stored in the ROM 304 is loaded into the RAM 303 and the program code is executed by the CPU 302.

In step S1601, the CPU 302 acquires sheet size information for the print job on which the inspection setting process is performed.

In step S1602, the CPU 302 calculates the number of settable areas per page based on the sheet size information acquired in step S1601. FIG. 17 illustrates an example of the number of settable areas per page corresponding to each sheet size for the print job. For example, if the sheet size for the print job is "A3", 30 text inspection areas can be set as the number of settable areas, and if the sheet size for the print job is "B5", 25 text inspection areas can be set as the number of settable areas. The reason why the number of settable areas varies depending on the sheet size is that the time from the end of reading a first sheet (start of inspection on a first sheet) to the end of reading a second sheet (end of inspection on the first sheet), or the inspection time for one sheet, varies depending on the sheet size. The inspection apparatus 110 stores information illustrated in FIG. 17 in the RAM 303 or a storage unit (not illustrated). The number of settable areas illustrated in FIG. 11 is dependent on a sheet conveyance speed of the image forming apparatus 100. Accordingly, it may be desirable to hold a table having the number of settable areas that varies depending on the sheet conveyance speed of the image forming apparatus 100, for example, depending on the model of the image forming apparatus 100. The present exemplary embodiment illustrates an example where a table for each sheet size is used. However, for example, when the sheet conveyance speed varies depending on the sheet type, a table in which the number of settable areas is set for each sheet type may be used.

In step S1603, the CPU 302 determines whether the settings on all areas are completed. In this case, the determination is made based on whether the button 1221 illustrated in FIG. 12-1A is pressed. If the button 1221 is pressed and it is determined that the settings for all areas are completed (YES in step S1603), the processing proceeds to step S1612. If the button 1221 is not pressed (NO in step S1603), the processing proceeds to step S1604.

In step S1604, the CPU 302 determines whether an inspection area is added or deleted.

If the button 1206 or the button 1207 is pressed and a text inspection area or a barcode inspection area is additionally set to the area 1209 (ADDED in step S1604), the processing proceeds to step S1605. If the button 1203 is pressed and the inspection area is deleted (DELETED in step S1604), the processing proceeds to step S1609.

In step S1605, upon accepting the change of the inspection setting item, the CPU 302 acquires the inspection setting value in the selected inspection area. For example, in the case of setting the text inspection area, when the change of one of the setting items is accepted in the setting area 1225 illustrated in FIG. 12-1B, the CPU 302 acquires all setting values in the setting area 1225. In the case of setting the barcode inspection area, when the change of any one of the setting items is accepted in the setting area 1233 illustrated in FIG. 12-2A, the CPU 302 acquires all setting values in the setting area 1233.

In step S1606, the CPU 302 determines whether the inspection settings on the selected area are completed. In the case of setting the text inspection area, the CPU 302 determines whether all setting values in the setting area 1225 illustrated in FIG. 12-1B are already set. In the case of setting the barcode inspection area, the CPU 302 determines whether all setting values in the setting area 1233 illustrated in FIG. 12-2A are already set.

If the settings are completed (YES in step S1606), the processing proceeds to step S1607. If the settings are not completed (NO in step S1606), the processing returns to step S1605 to receive the input of the setting item.

In step S1607, the CPU 302 calculates the number of areas used in the selected area.

The number of used areas is calculated based on at least one of the setting values of the code type, the character type, and the number of characters set in the setting area 1225 illustrated in FIG. 12-1B or the setting area 1233 illustrated in FIG. 12-2A. Specifically, the number of used areas is calculated using conversion tables illustrated in FIGS. 18A and 18B. FIGS. 18A and 18B illustrate pieces of table information used to calculate the number of used areas corresponding to the setting values acquired in step S1605 on the text inspection area and the barcode inspection area. These pieces of table information are preliminarily stored in the RAM 303. The present exemplary embodiment illustrates an example where the set inspection area acquired in step S1605 is a barcode inspection area corresponding to "code 1", and the character type=alphanumeric character and the number of characters=up to 950 are set as the setting values acquired in step S1605 on the same area. In this case, the amount of data composed of the character type=alphanumeric character and the number of characters=up to 950 included in the area selected in step S1605 is calculated as five areas corresponding to the number of used inspection areas. The conversion of the data amount and the number of used areas is performed based on, for example, the conversion tables illustrated in FIGS. 18A and 18B. The calculated number of used areas is stored in the RAM 303.

In this case, the five areas corresponding to the number of used areas indicates that the time for data inspection is about five times as long as that for the number of used areas of "1" set as the reference value.

In step S1608, the CPU 302 adds the number of used areas calculated in step S1607 to the total number of set areas on the currently displayed page.

In step S1609, the CPU 302 calculates the number of areas used from among the areas to be deleted. In this case, the number of areas used from among the deleted areas is read out from the RAM 303.

In step S1610, the number of used areas calculated in step S1609 is subtracted from the total number of set areas on the currently displayed page.

In step S1611, the CPU 302 updates the display of the setting item 1218 illustrated in FIGS. 12-1B and 12-2A using the total number of set areas calculated in step S1608 or step S1610 and the number of used areas in the currently-selected area. If an area is deleted (DELETED in step S1604), the number of used areas in the currently-selected area is "0". After completion of the processing of step S1611, the CPU 302 is brought into the standby state, and then the processing returns to step S1603.

In step S1612, the CPU 302 stores the inspection settings in the RAM 303 and completes the inspection setting process. The inspection setting flow in step S405 has been described above.

As described above, according to the present exemplary embodiment, when the operator sets an inspection area, it is possible for the operator to set the inspection area to be inspected after recognizing the number of inspection areas on which the inspection process for the printed sheet can be completed within a time limit. In addition, it is possible to provide a notification indicating whether the inspection can be completed within the time limit, thereby enabling the operator to determine whether the inspection can be executed before the inspection is performed. Consequently, it is possible to provide a printing system capable of reliably performing inspection processing on the set inspection area.

The above-described exemplary embodiments illustrate a method for acquiring setting items for calculating the number of used areas during inspection setting for the text inspection and barcode inspection, calculating the total number of set areas, and thereby providing a notification indicating whether the inspection can be completed within a time limit. However, in the method according to the above-described exemplary embodiment, it may be desirable for the operator to manually input the character type setting item 1236 and the number-of-characters setting item 1237 illustrated in FIG. 12-2A. In particular, it may be difficult for the operator to discriminate the number of characters used in a barcode only by viewing the code printed on the reference image. Accordingly, it may be desirable to check the content of the correct answer CSV file and thus it may be difficult to set the number of characters for a barcode.

The present exemplary embodiment illustrates a method for automatically setting the character type and the number of characters to thereby reduce the setting load on the operator in the case of designating a column number to be compared with the correct answer CSV file.

Differences between the present exemplary embodiment and the above-described exemplary embodiment will be described below. The components that are not described in detail are identical to the components in the above-described exemplary embodiment.

Figure 19:
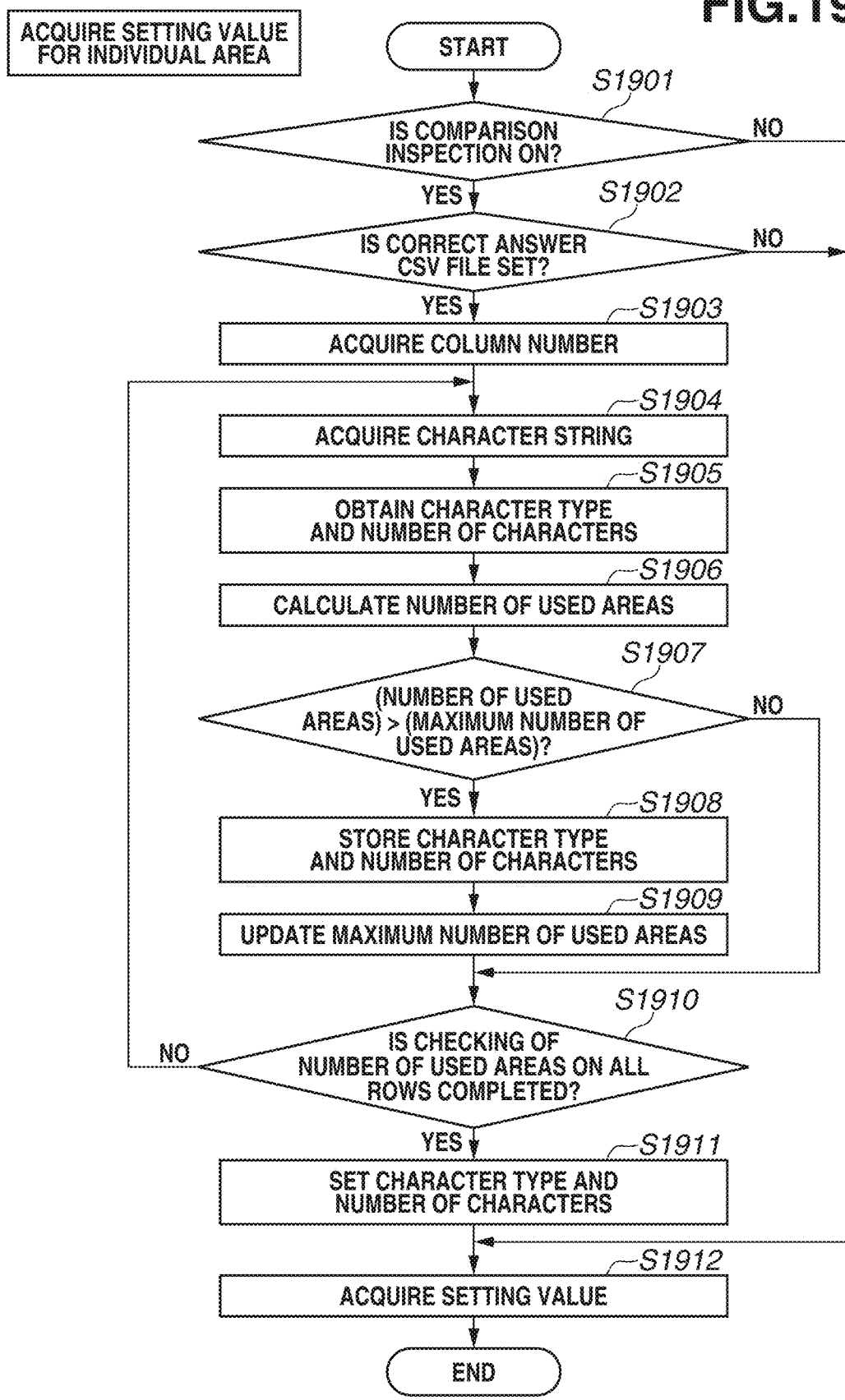
FIG. 19 illustrates an example of a flowchart for processing in step S1605 according to a second exemplary embodiment.

The detailed processing of accepting the setting change item in step S1605 according to the present exemplary embodiment will be described with reference to FIG. 19. This flowchart is implemented when a program code stored in the ROM 304 is loaded into the RAM 303 and the program code is executed by the CPU 302.

The present exemplary embodiment illustrates an example where the area 1212 illustrated in FIG. 12-2A is selected.

In step S1901, the CPU 302 determines whether to perform the comparison inspection. In this case, it is determined whether the comparison inspection in the setting item 1238 is "ON". If the comparison inspection is "ON" (YES in step S1901), the processing proceeds to step S1902. If the comparison inspection is "OFF" (NO in step S1901), the processing proceeds to step S1912.

In step S1902, the CPU 302 determines whether the correct answer CSV file is set in the setting area 1223. If the correct answer CSV file is set (YES in step S1902), the processing proceeds to step S1903. If the correct answer CSV file is not set (NO in step S1902), the processing proceeds to step S1912.

In step S1903, the CPU 302 acquires the column number from the setting item 1239 illustrated in FIG. 12-2A.

In step S1904, the CPU 302 acquires the character string corresponding to the column number acquired in step S1903 from the correct answer CSV file.

In step S1905, the CPU 302 obtains the character type and the number of characters from the character string acquired in step S1904.

In step S1906, the CPU 302 calculates the number of used areas based on the table information illustrated in FIG. 18B using the character type and the number of characters in the character string acquired in step S1905 and the setting value of the code type.

In step S1907, the CPU 302 determines whether the number of used areas calculated in step S1906 is greater than a maximum number of used areas. The maximum number of used areas is a counter value for searching a row in which the number of used areas is largest on all rows in the designated column of the correct answer CSV file. The initial value of the maximum number of used areas is "0". If the number of used areas is greater than the maximum number of used areas (YES in step S1907), the processing proceeds to step S1908. If the number of used areas is less than or equal to the maximum number of used areas (NO in step S1907), the processing proceeds to step S1910.

In step S1908, the CPU 302 stores in the RAM 303 information about the character type and the number of characters in the character string corresponding to the current row.

In step S1909, the CPU 302 updates the maximum number of used areas with the number of used areas calculated in step S1906.

In step S1910, the CPU 302 determines whether checking of the number of used areas on all rows of the correct answer CSV file is completed. If checking on all rows is completed (YES in step S1910), the processing proceeds to step S1911. If checking on all rows is not completed (NO in step S1910), the processing proceeds to the next row, and the processing returns to step S1904.

In step S1911, the CPU 302 sets the character type and the number of characters stored in step S1908 in the setting item 1236 and the setting item 1237, respectively, illustrated in FIG. 12-1B. In this case, the group to which the number of characters stored in step S1908 belongs in the table illustrated in FIG. 18B is set as the value set in the setting item 1237.

In step S1912, the CPU 302 acquires the setting value in the setting area 1233.

The processing flow of accepting the setting change item in step S1605 is described above.

As described above, according to the present exemplary embodiment, when the column number to be compared with the correct answer CSV file is designated, the character type and the number of characters are automatically set to thereby reduce the setting load on the operator.

The above-described first and second exemplary embodiments illustrate a method for acquiring the setting items for calculating the number of used areas during the inspection setting in the text inspection or barcode inspection, and calculating the total number of set areas, and thereby providing a notification indicating whether the inspection can be completed within a time limit. However, in the method according to the first and second exemplary embodiments, in the case of executing the inspection, the operator changes the setting, for example, by reducing the number of inspection areas to be set. Accordingly, there is a possibility that the inspection on a desired portion to be inspected cannot be executed.

The present exemplary embodiment illustrates a control method for executing the inspection without causing an inspection error even when the total number of set areas exceeds the number of settable areas.

Figure 20:
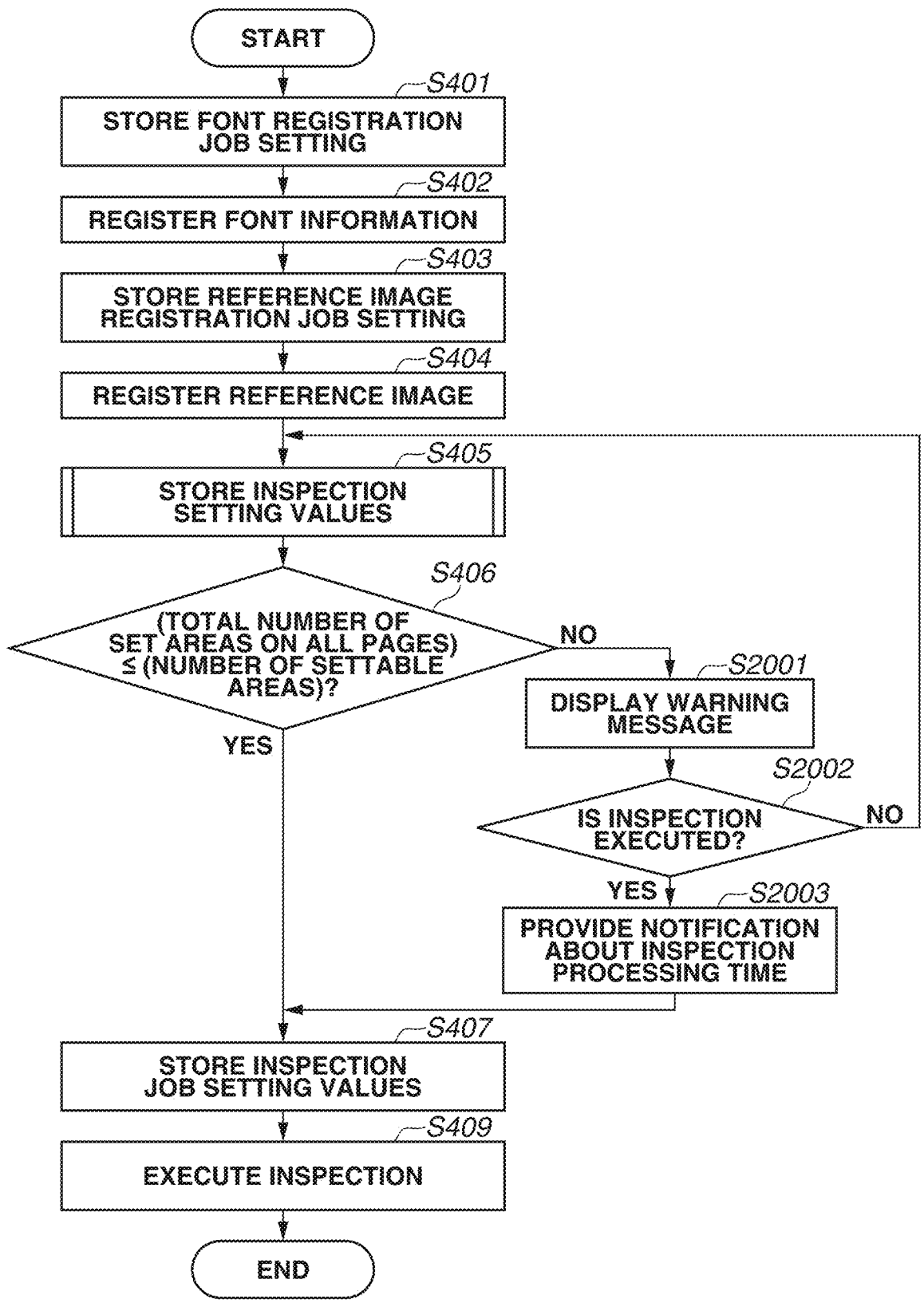
FIG. 20 illustrates an example of a flowchart for overall inspection processing according to a third exemplary embodiment.

A processing flow from a registration work before the inspection is started to execution of the inspection in the inspection apparatus 110 according to a third exemplary embodiment will be described with reference to a flowchart illustrated in FIG. 20.

This flowchart is implemented when a program code stored in the ROM 304 is loaded into the RAM 303 and the program code is executed by the CPU 302.

Figure 4:
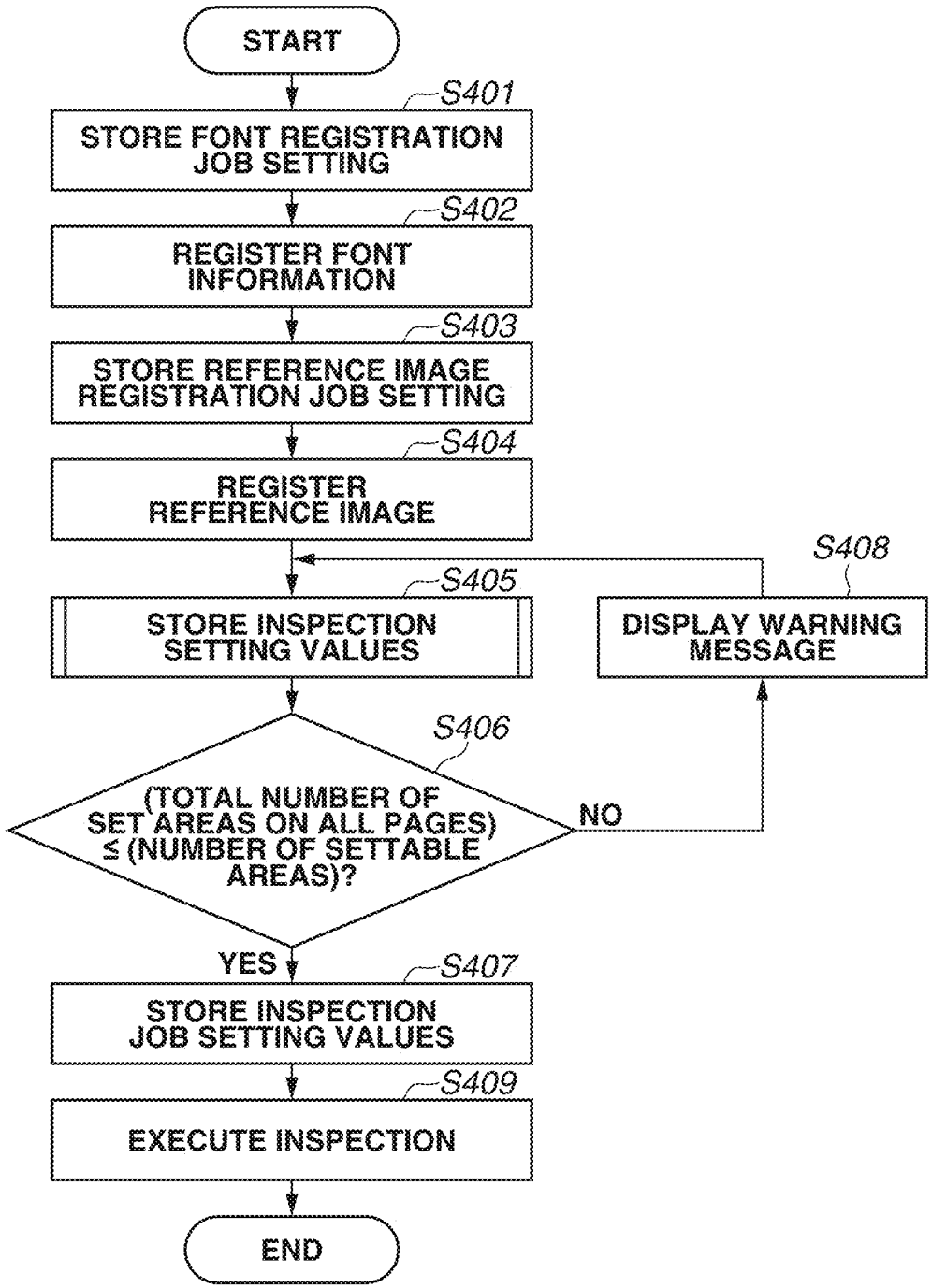
FIG. 4 illustrates an example of a flowchart illustrating overall inspection processing according to the first exemplary embodiment.

Steps S401 to S407 and step S409 are identical to those illustrated in FIG. 4, and thus the descriptions thereof are omitted.

Figure 21:
FIG. 21 illustrates an example of a warning message screen according to the third exemplary embodiment.

In step S2001, the CPU 302 displays a warning message indicating that the total number of set areas exceeds the number of settable areas on the UI unit 320. FIG. 21 illustrates an example of the warning screen according to the present exemplary embodiment. If the total number of set areas exceeds the number of settable areas on at least one page, a screen 2100 is displayed to prevent the occurrence of an inspection error due to inspection processing accidentally performed. Information indicating whether to execute the inspection at a lower printing speed is presented to the operator. In the present exemplary embodiment, information indicating that printing is performed at a lower printing speed is provided. However, the actual printing speed may also be displayed.

A button 2101 is an OK button to accept the reduction in the printing speed and to execute the inspection.

When the button 2101 is pressed, the screen transitions to the inspection job setting screen 1300 illustrated in FIG. 13.

A button 2102 is used to hide the screen 2100. When the button 2102 is pressed, the screen transitions to the inspection setting screen 1200 illustrated in FIGS. 12-1A to 12-2B. The screen 2100 illustrated in FIG. 21 may be configured to be displayed in a superimposed manner on the inspection setting screen 1200 illustrated in FIGS. 12-1A to 12-2B.

In step S2002, the CPU 302 determines whether the inspection execution is set. If the button 2101 illustrated in FIG. 21 is pressed (YES in step S2002), the processing proceeds to step S2003. If the button 2102 illustrated in FIG. 21 is not pressed (NO in step S2002), the processing returns to step S405 for inspection setting.

In step S2003, the CPU 302 provides a notification about the printing speed to the image forming apparatus 100, and the processing proceeds to step S407. In step S2003, the inspection processing time used for each page is calculated based on the total number of set areas used for the determination in step S406, and a notification about the calculated inspection processing time is provided to the image forming apparatus 100. When the inspection processing time required for each area is 20 msec and the total number of set areas is "33", the inspection processing time required for each page is 660 msec. The CPU 302 provides a notification about the inspection processing time of 660 msec to the image forming apparatus 100.

Upon receiving the notification, the CPU 202 of the image forming apparatus 100 adjusts a distance between print pages (a distance from a trailing edge of the first sheet to a leading edge of the second sheet). For example, in the case of printing an A4-size sheet at 100 ppm, it may be desirable to perform the processing at 600 msec on each sheet. When the sheet conveyance speed is 800 mm/sec and the size of the A4-size sheet in the conveyance direction is 210 mm, the time for reading data from the leading edge of a sheet to the trailing edge of the sheet is 263 msec. In the case of performing printing at 100 ppm, the time between print pages is 600−263=337 msec. If the inspection time of 660 msec is required, the CPU 202 of the image forming apparatus 100 sets the time between print pages as 397 (=660−263) msec.

In step S409, the image forming apparatus 100 executes printing at the time between print pages calculated in step S407, and the inspection apparatus 110 executes inspection processing on the printed material conveyed from the image forming apparatus 100.

The entire processing flow from the registration work before the inspection is started to execution of the inspection according to the present exemplary embodiment has been described above.

The present exemplary embodiment illustrates an example where the warning screen illustrated in FIG. 21 is displayed when the inspection settings are completed. Specifically, in step S1603 illustrated in FIG. 20, it is determined whether the total number of set areas calculated in step S406 on all pages set for the inspection process in step S506 is less than or equal to the calculated number of settable areas. If the total number of set areas is more than the number of settable areas, the warning display is performed in step S2001. However, the warning display may be performed during the inspection setting.

This is because it is assumed that the warning display is performed at a timing when the user sets inspection areas more than the number of settable areas. For example, when the display of the graph is updated in step S1611 illustrated in FIG. 16, the determination is then performed in the same manner as described above in step S406. When the number of set inspection areas is more than or equal to the number of settable areas, the screen 2100 may be displayed in a superimposed manner on the inspection setting screen 1200 illustrated in FIGS. 12-1A to 12-2B. Alternatively, when the number of set inspection areas is more than or equal to the number of settable areas, the warning message may be displayed on the inspection setting screen 1200 illustrated in FIGS. 12-1A to 12-2B. The method for displaying the warning message during the inspection setting is not particularly limited.

More alternatively, the warning message may be displayed before the inspection process is executed. Specifically, when the button 1402 on the inspection screen 1400 illustrated in FIGS. 14A and 14B is pressed, the screen 1500 may be displayed in a superimposed manner on the screen 1400.

As described above, according to the present exemplary embodiment, it is possible to perform control to execute the inspection process without causing an inspection error even when the total number of set areas exceeds the number of settable areas.

While the exemplary embodiments and various modifications of the exemplary embodiments are described above, the gist and scope of the exemplary embodiments are not limited to specific descriptions of the present disclosure.

The exemplary embodiments can also be implemented by the following processing. That is, a program for implementing one or more functions according to the above-described exemplary embodiments is supplied to a system or an apparatus via a network or a storage medium, and one or more processors in a computer of the system or the apparatus read out and execute the program.

The exemplary embodiments can also be implemented by a circuit (e.g., an application specific integrated circuit (ASIC)) for implementing one or more functions according to the exemplary embodiments.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-028901, filed Feb. 28, 2022, which is hereby incorporated by reference herein in its entirety.

What is claimed is:

1. An inspection apparatus comprising:
a reader configured to generate image data by scanning a printed material;
a display configured to display information; and
one or more controllers having one or more processors and one or more memories, the one or more controllers being configured to:
set inspection setting that includes one or more inspection areas including an object for a reference image taken as a reference for inspection;
conduct an inspection of the printed material by inspecting the image data generated by the reader on a basis of the reference image and the inspection setting in a case where the inspection setting satisfies a predetermined condition; and
not conduct an inspection of the printed material in a case where the inspection setting does not satisfy the predetermined condition,
wherein the predetermined condition is that an inspection amount calculated on a basis of the one or more inspection areas included in the inspection setting and a data amount included in the one or more inspection areas is less than an upper limit,
wherein the display displays the upper limit and the inspection amount in an associated manner,
wherein the printed material includes a plurality of pages,
wherein the inspection setting is set on a page-by-page basis for the plurality of pages, and
wherein, before the inspection is conducted, the inspection amount set in the inspection setting for one page is notified on a basis of a difference of an inspection amount of the one page set in the inspection setting from an upper limit of the inspection amount of the one page settable in the inspection setting.

2. The inspection apparatus according to claim 1,
wherein displaying of the inspection amount set in the inspection setting on the display is performed using a graph, and
wherein the one or more controllers are configured to cause the display to display, on a setting screen of the inspection setting, the graph to enable recognition of the upper limit of data to be inspected by the inspection apparatus in association with the graph indicating the inspection amount based on an amount of data on the object included in the one or more inspection areas.

3. The inspection apparatus according to claim 1,
wherein displaying of the inspection amount set in the inspection setting on the display is performed using a graph, and
wherein, in a case where there is a plurality of the inspection areas, the one or more controllers are configured to calculate an inspection amount of each of the plurality of the inspection areas on a basis of a data amount included in each of the plurality of the inspection areas, calculate a sum of the inspection amounts of the respective inspection areas, and cause the display to display the upper limit and the sum of the inspection amounts as the graph.

4. The inspection apparatus according to claim 1, wherein, in a case where there is a plurality of the inspection areas, the one or more controllers are configured to calculate an inspection amount of each of the plurality of the inspection areas on a basis of a data amount included in each of the plurality of the inspection areas, calculate a sum of the inspection amounts of the respective inspection areas, and cause the display to display the sum of the inspection amounts and the inspection amount calculated based on an amount of data included in a last-setting-received inspection area in an individually recognizable.

5. The inspection apparatus according to claim 1, wherein displaying of the inspection amount on the display is performed using a bar graph.

6. The inspection apparatus according to claim 1, wherein the one or more controllers are configured to cause the display to display a warning message on a screen in a case where a sum of the inspection amounts based on an amount of data on the object included in the one or more inspection areas exceeds the upper limit.

7. The inspection apparatus according to claim 1,
wherein the one or more controllers are configured to:
register the reference image; and
cause the display to display a preview of the registered reference image, and
wherein the reference image displayed as the preview includes the object to be inspected.

8. The inspection apparatus according to claim 1,
wherein the inspection apparatus is connected to a printing apparatus configured to print an image on a recording sheet, and
wherein the reader scans a printed material on which the image is printed by the printing apparatus.

9. The inspection apparatus according to claim 8, wherein the one or more controllers are configured to preliminarily calculate the upper limit of the inspection amount settable in the inspection setting for the inspection based on a size of the recording sheet and a printing speed of the printing apparatus.

10. The inspection apparatus according to claim 1, wherein the one or more controllers are configured to calculate an amount of data on the object included in the one or more inspection areas based on at least one of setting values of a code type, a character type, and a number of characters in the data on the object included in the one or more inspection areas.

11. The inspection apparatus according to claim 1, wherein the one or more controllers are configured to perform the inspection by comparing the image data with the reference image.

12. The inspection apparatus according to claim 1, wherein the one or more controllers are configured to obtain a character string as the object.

13. The inspection apparatus according to claim 1, wherein the one or more controllers are configured to obtain a barcode as the object.

14. The inspection apparatus according to claim 1, wherein the one or more controllers are configured to cause the display to display a warning message to prompt a user to reset the inspection setting when the inspection amount exceeds the upper limit.

15. The inspection apparatus according to claim 1, wherein the one or more controllers are configured to cause the display to display, as a warning message, a notification to change a printing speed in printing.

16. The inspection apparatus according to claim 15, wherein the one or more controllers are configured to change the printing speed to a printing speed for the inspection apparatus to execute the inspection for which the inspection amount set in the inspection setting exceeds the upper limit.

17. The inspection apparatus according to claim 1, wherein the object to be inspected is included in a variable area portion among the one or more areas in printing in which a content to be printed out on a sheet is variable based on data.

18. The inspection apparatus according to claim 1, wherein an additional inspection amount based on an amount of data on a target of inspection included in the one or more inspection areas is added to the inspection amount displayed in advance, and the inspection amount after the addition is displayed as a graph at a timing when an additional inspection area is set.

19. A control method for an inspection apparatus including a reader configured to generate image data by scanning a printed material and a display configured to display information, the control method comprising:
setting inspection setting that includes one or more inspection areas including an object for a reference image taken as a reference for inspection;
conducting an inspection of the printed material by inspecting the image data generated by the reader on a basis of the reference image and the inspection setting in a case where the inspection setting satisfies a predetermined condition; and
not conducting an inspection of the printed material in a case where the inspection setting does not satisfy the predetermined condition,
wherein the predetermined condition is that an inspection amount calculated on a basis of the one or more inspection areas included in the inspection setting and a data amount included in the one or more inspection areas is less than an upper limit,
wherein the display displays the upper limit and the inspection amount in an associated manner,
wherein the printed material includes a plurality of pages,
wherein the inspection setting is set on a page-by-page basis for the plurality of pages, and
wherein, before the inspection is conducted, the inspection amount set in the inspection setting for one page is notified on a basis of a difference of an inspection amount of the one page set in the inspection setting from an upper limit of the inspection amount of the one page settable in the inspection setting.

20. An inspection apparatus comprising:

a reader configured to generate image data by scanning a printed material;

a display configured to display information; and one or more controllers having one or more processors and one or more memories, the one or more controllers being configured to:

set inspection setting that includes one or more inspection areas including an object for a reference image taken as a reference for inspection;

conduct an inspection of the printed material by inspecting the image data generated by the reader on a basis of the reference image and the inspection setting in a case where the inspection setting satisfies a predetermined condition; and not conduct an inspection of the printed material in a case where the inspection setting does not satisfy the predetermined condition, wherein the predetermined condition is that an inspection amount calculated on a basis of the one or more inspection areas included in the inspection setting and a data amount included in the one or more inspection areas is less than an upper limit, wherein the display displays the upper limit and the inspection amount in an associated manner, and wherein the upper limit is a predetermined number of areas in use, and the inspection amount is a number of areas in use that has been area-converted on a basis of the calculated data amount.

* * * * *